Sept. 14, 1965   E. A. KAMP   3,205,915
APPARATUS FOR PRODUCING SPRING CORES
Filed May 15, 1961   16 Sheets-Sheet 1

INVENTOR.
Ewald A. Kamp
BY
Olson & Trexler
attys.

Sept. 14, 1965   E. A. KAMP   3,205,915
APPARATUS FOR PRODUCING SPRING CORES
Filed May 15, 1961   16 Sheets-Sheet 3

Sept. 14, 1965 E. A. KAMP 3,205,915
APPARATUS FOR PRODUCING SPRING CORES
Filed May 15, 1961 16 Sheets-Sheet 4

INVENTOR.
Ewald A. Kamp
By: Olson & Trexler attys

Sept. 14, 1965 E. A. KAMP 3,205,915
APPARATUS FOR PRODUCING SPRING CORES
Filed May 15, 1961 16 Sheets-Sheet 5
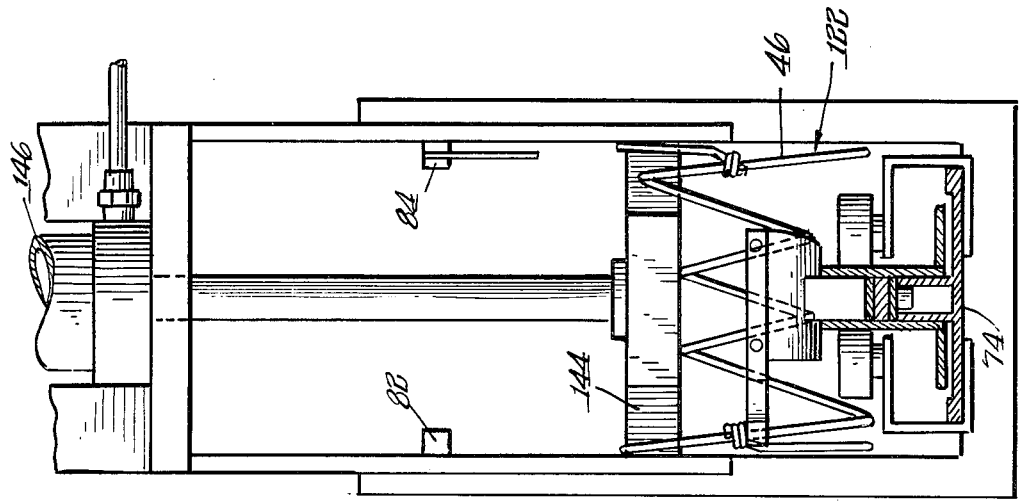
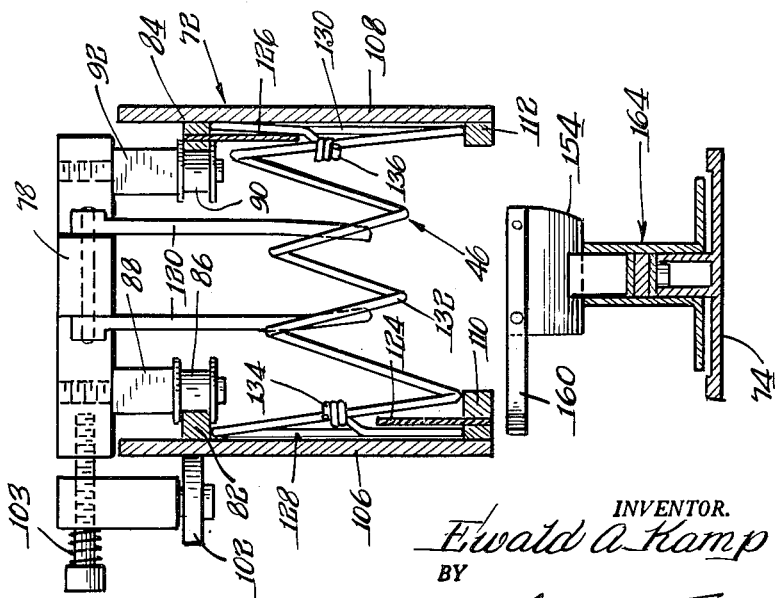
INVENTOR.
Ewald A. Kamp
BY
Olson & Trexler
attys

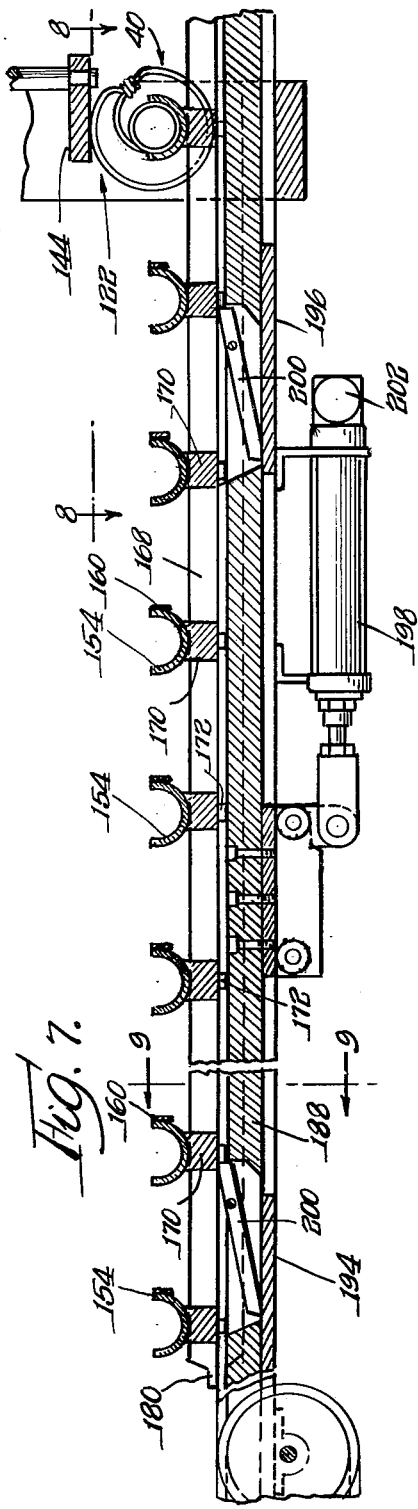

Sept. 14, 1965      E. A. KAMP      3,205,915
APPARATUS FOR PRODUCING SPRING CORES
Filed May 15, 1961      16 Sheets-Sheet 7
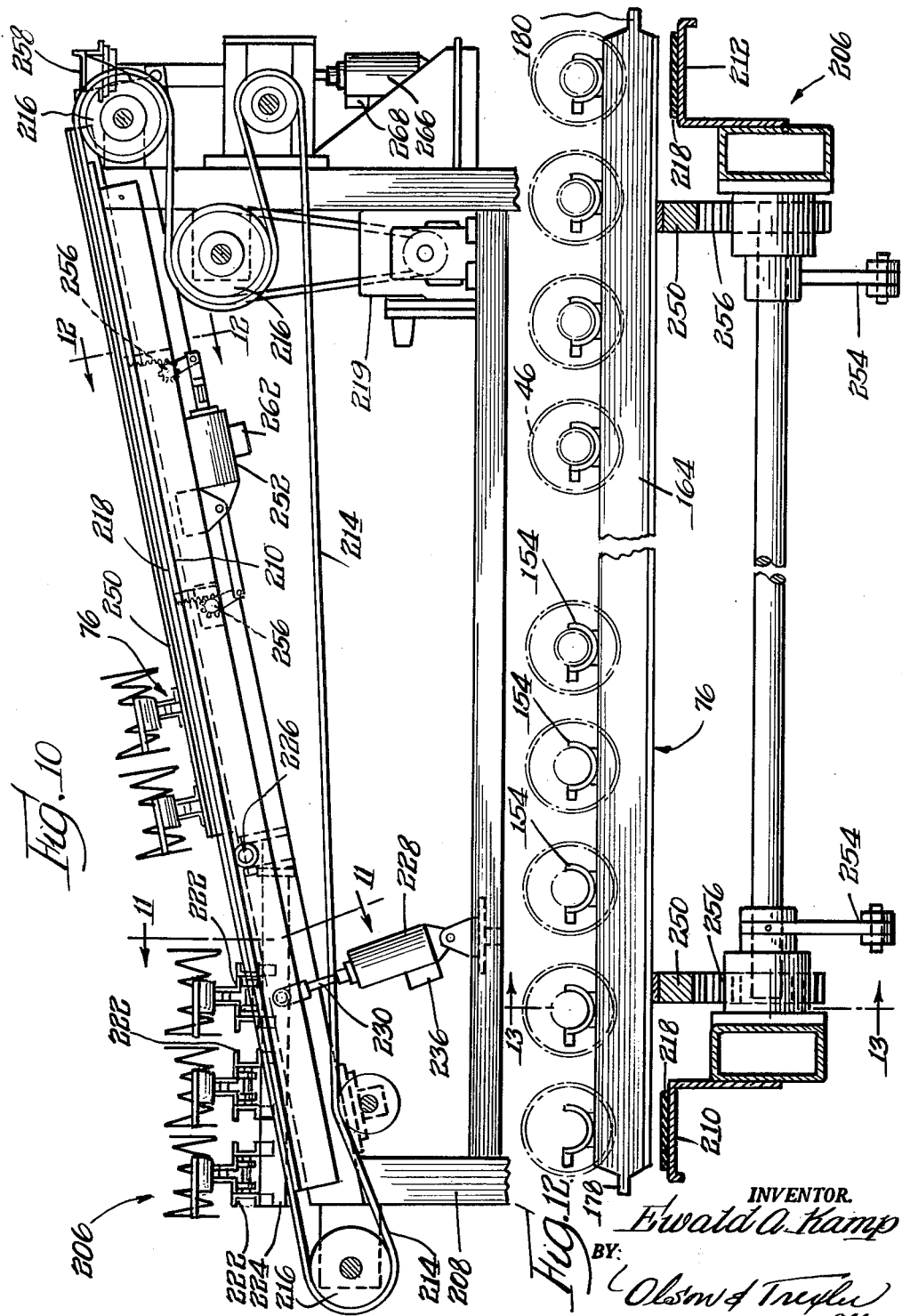
INVENTOR.
Ewald A. Kamp
BY Olson & Trexler
attys.

Sept. 14, 1965 E. A. KAMP 3,205,915
APPARATUS FOR PRODUCING SPRING CORES
Filed May 15, 1961 16 Sheets-Sheet 8
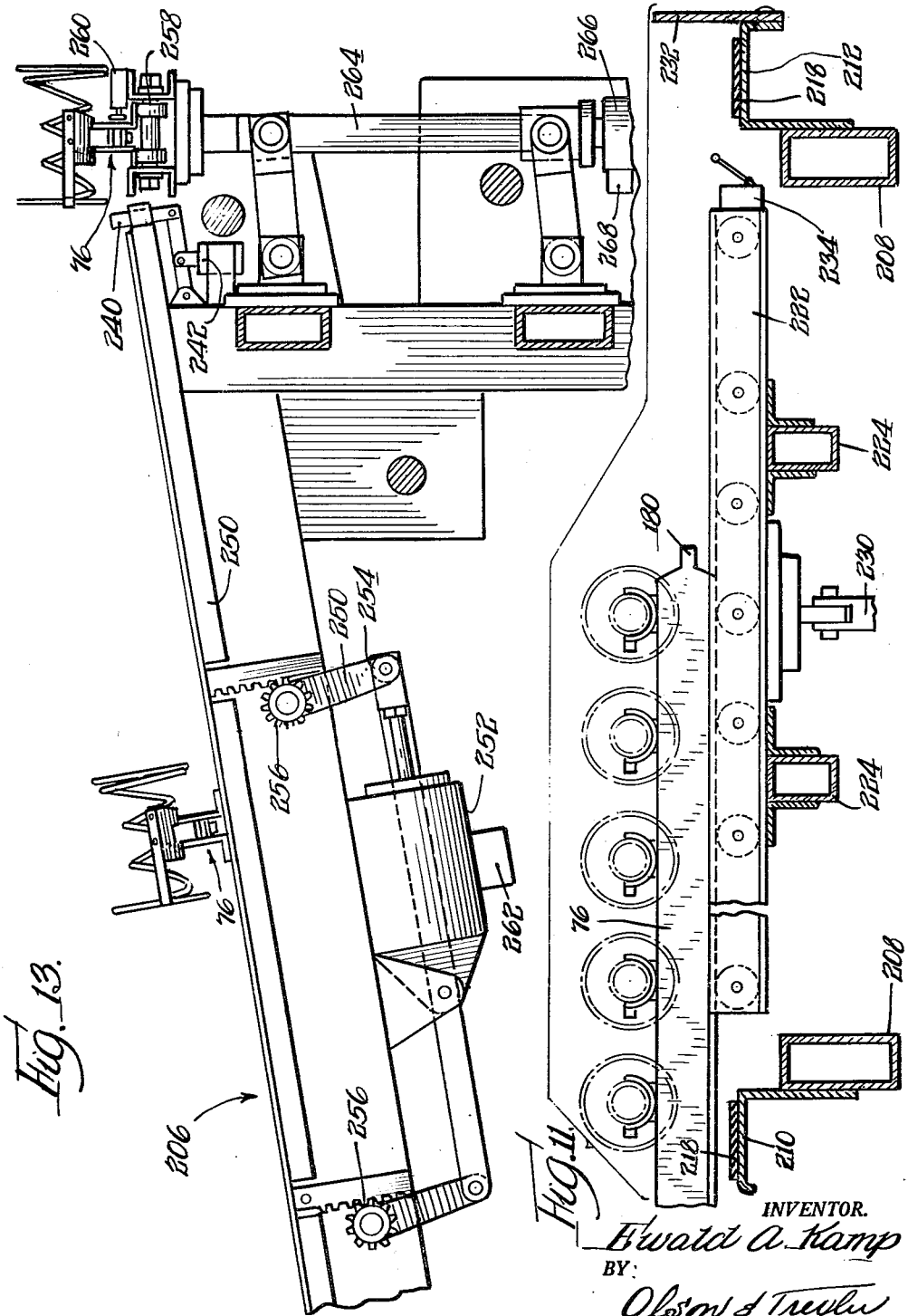
INVENTOR.
Ewald A. Kamp
BY
Olson & Trexler
Attys

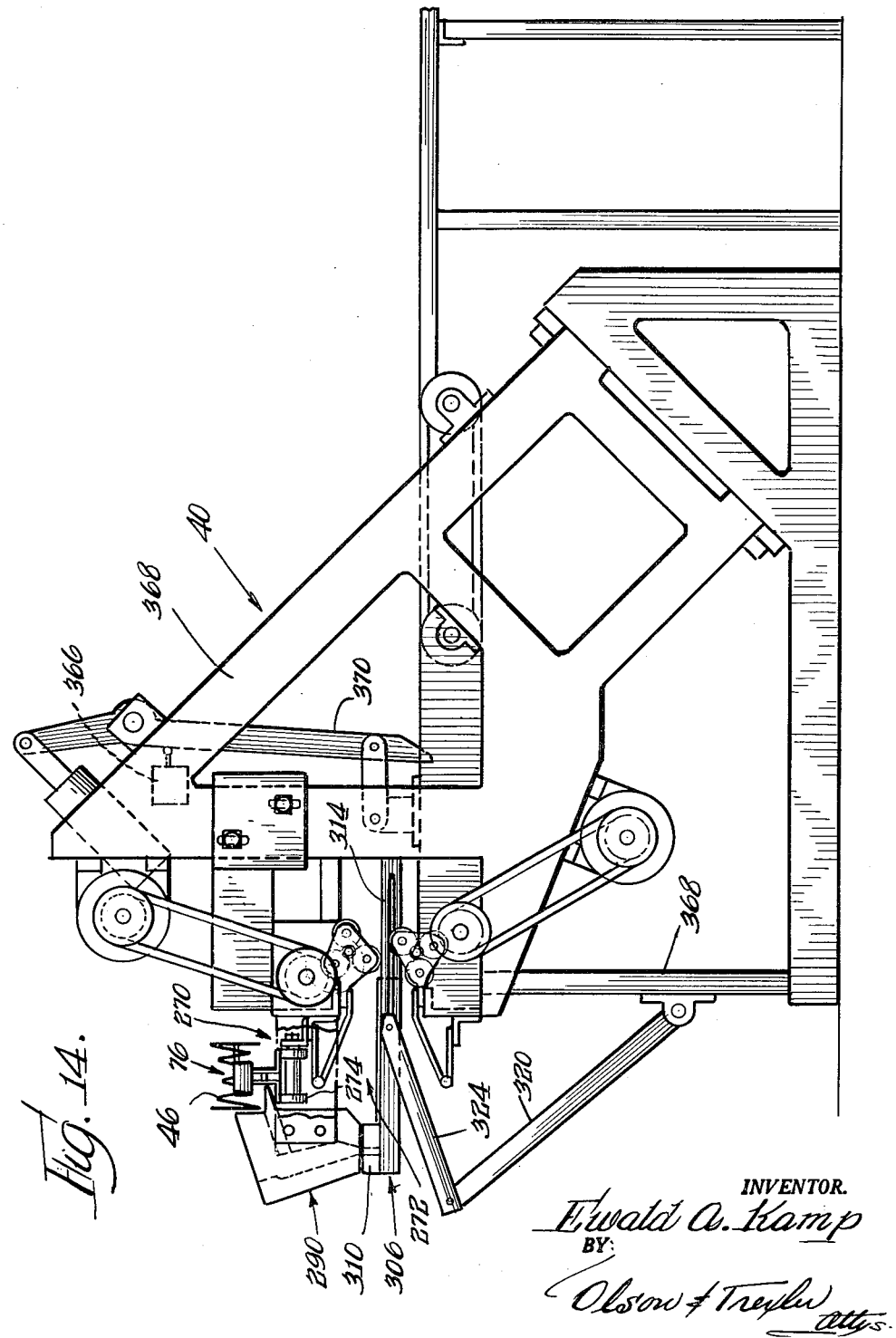

Sept. 14, 1965 E. A. KAMP 3,205,915
APPARATUS FOR PRODUCING SPRING CORES
Filed May 15, 1961 16 Sheets-Sheet 10
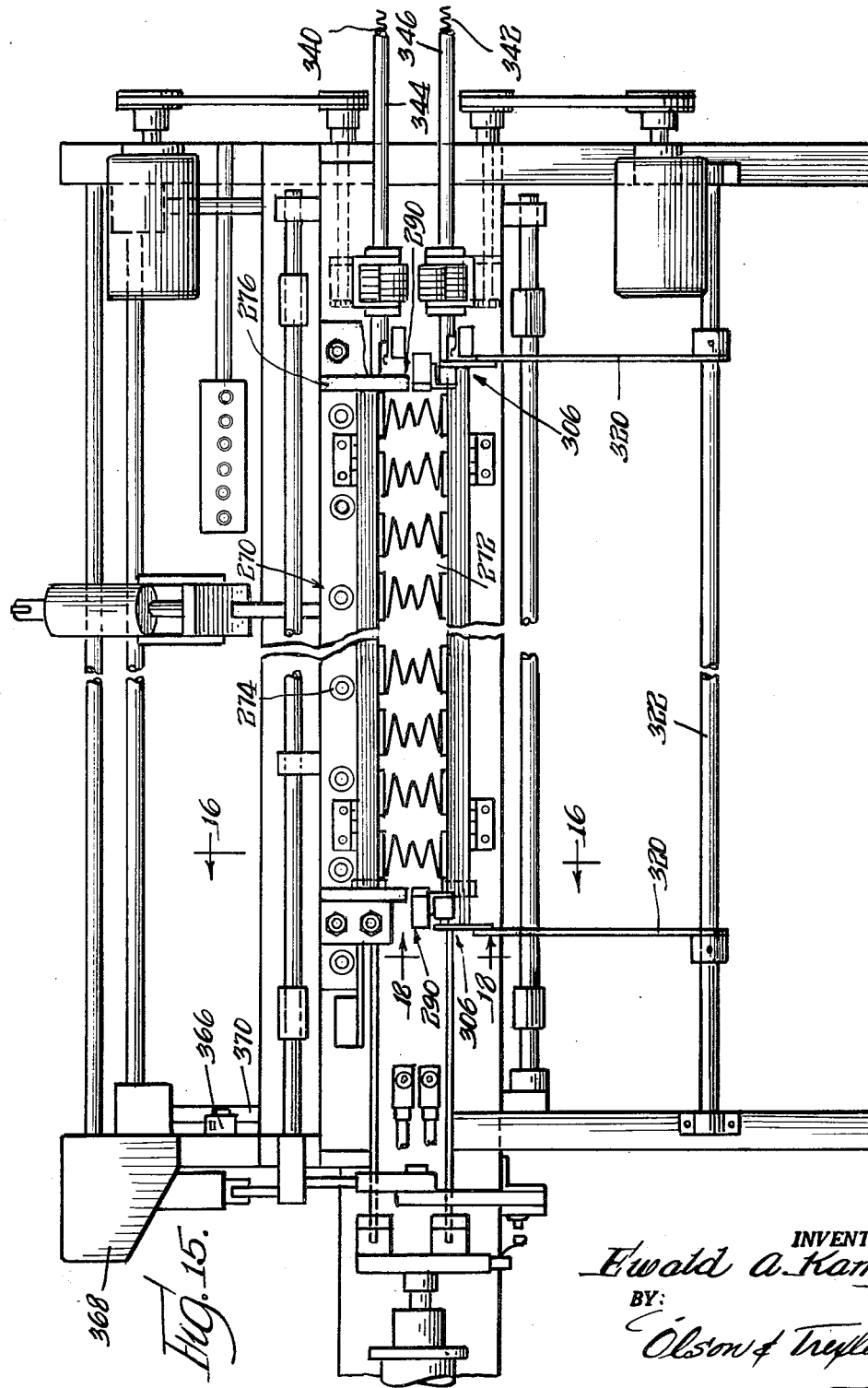
INVENTOR.
Ewald A. Kamp
BY:
Olson & Trexler
Attys.

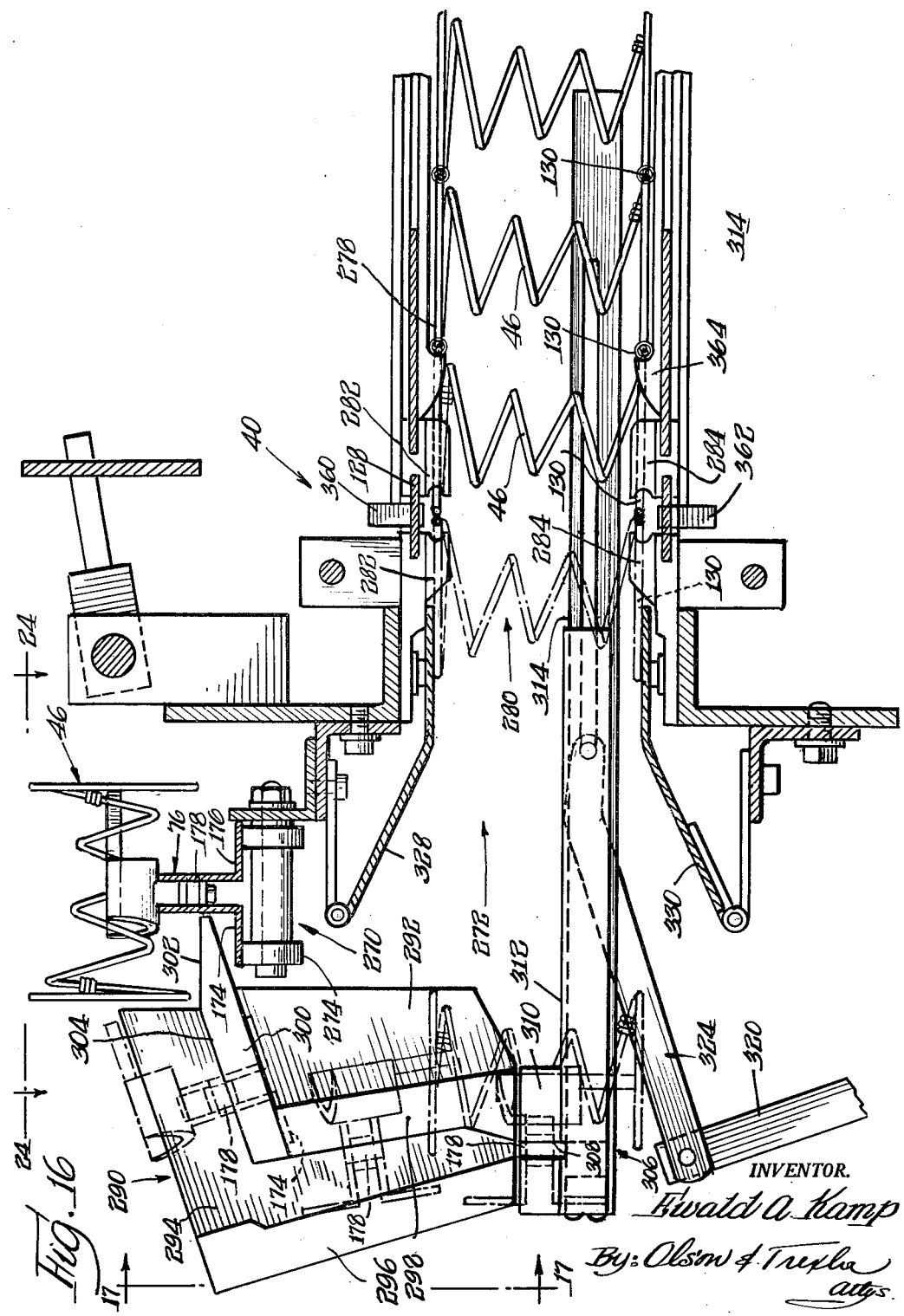

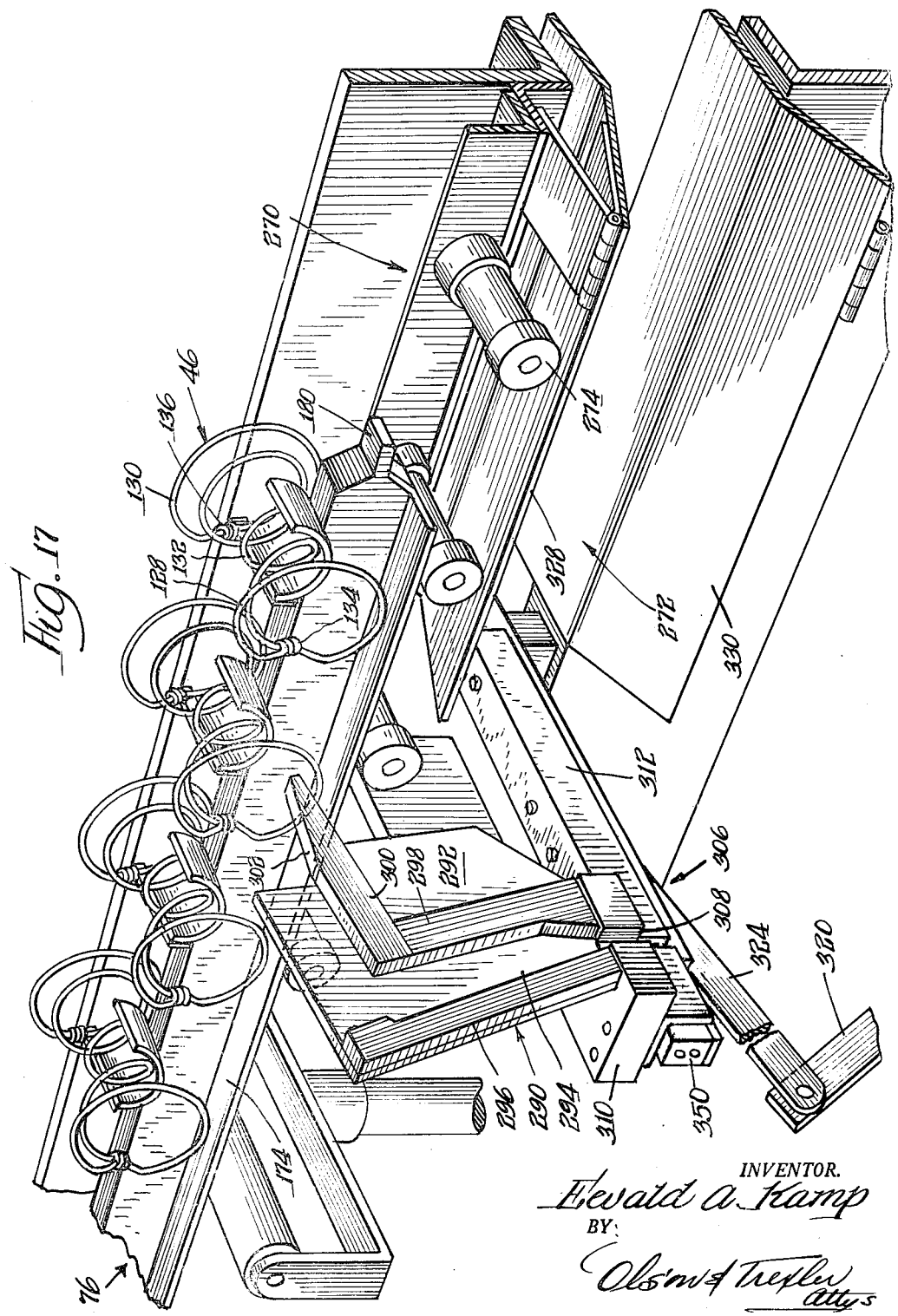

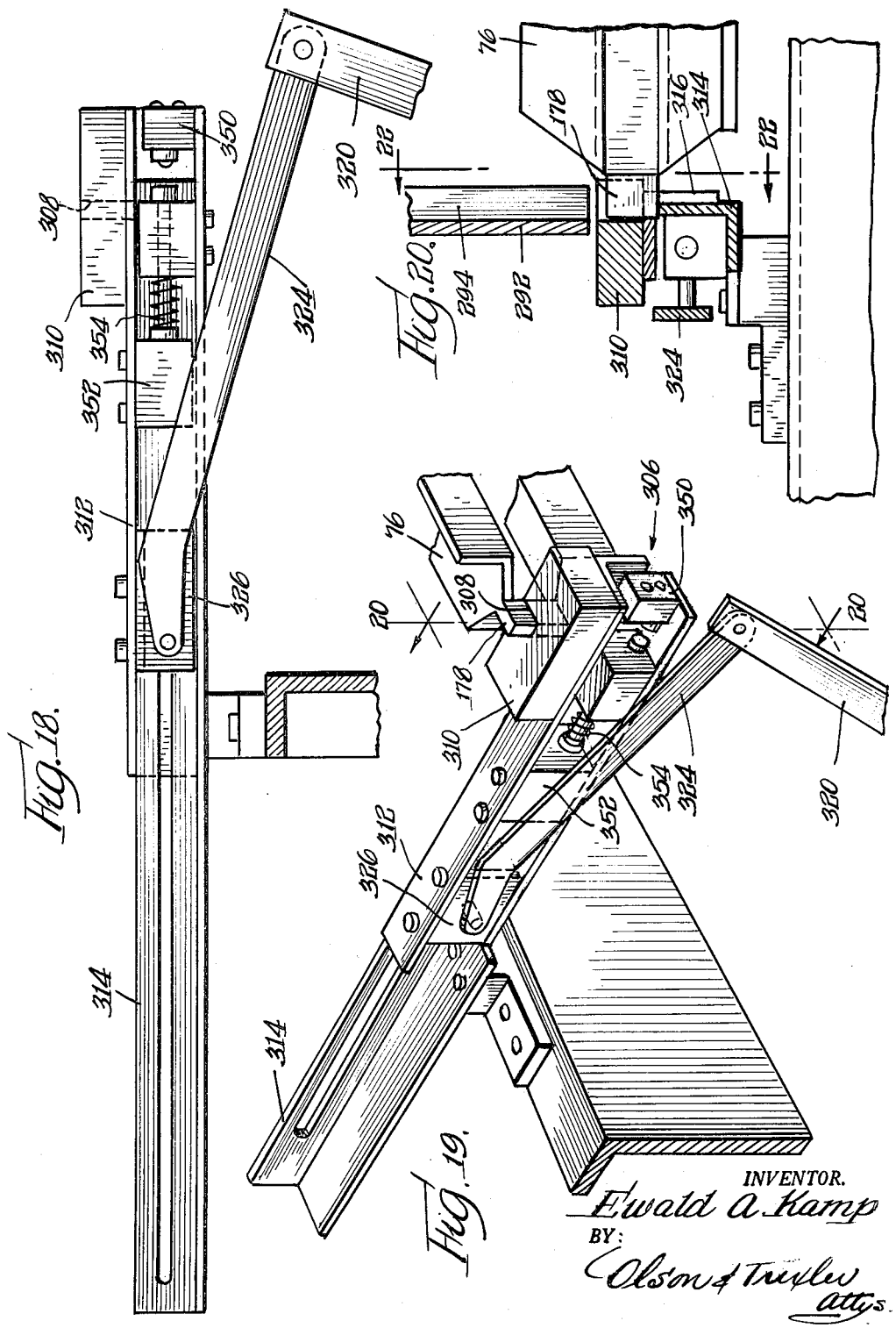

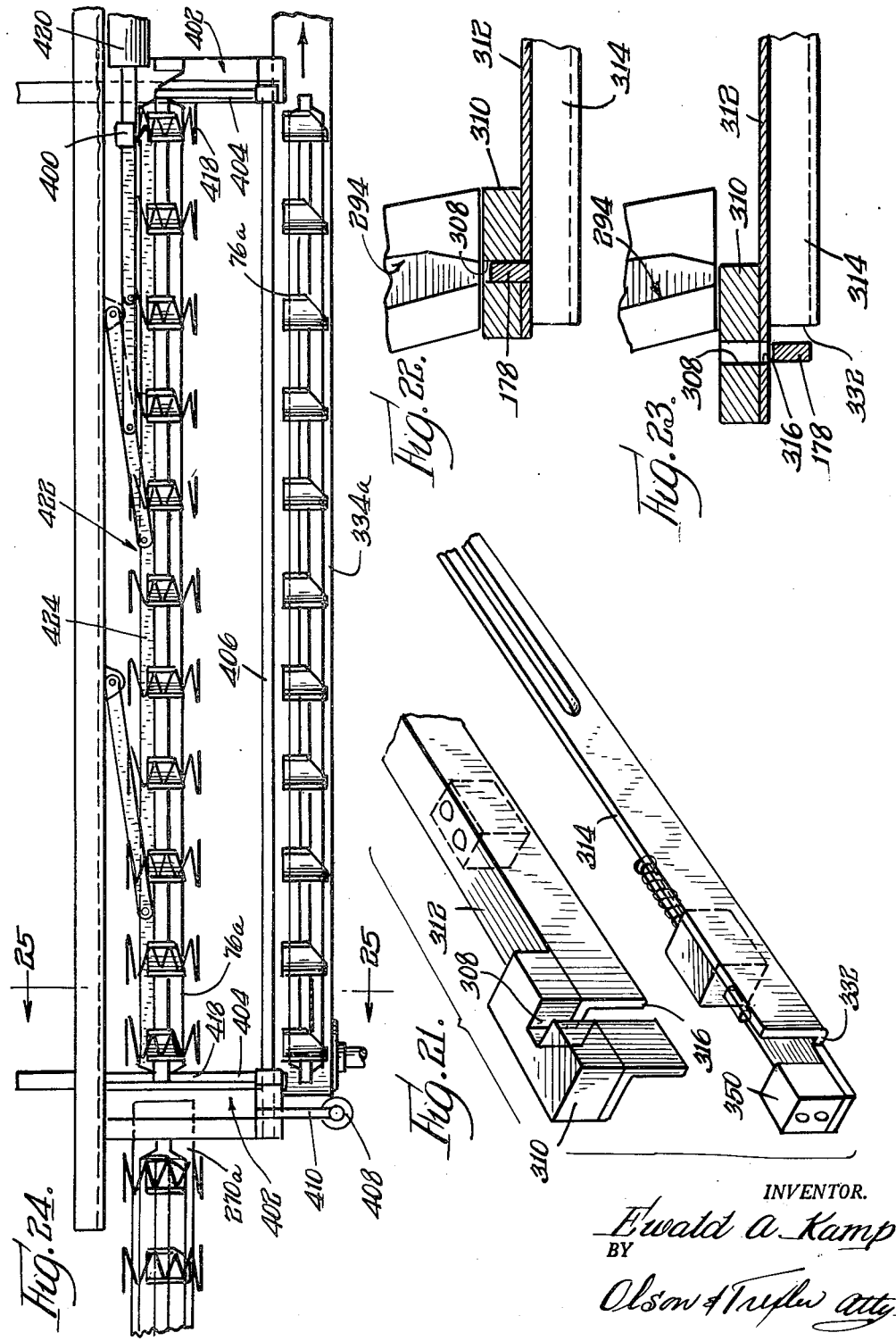

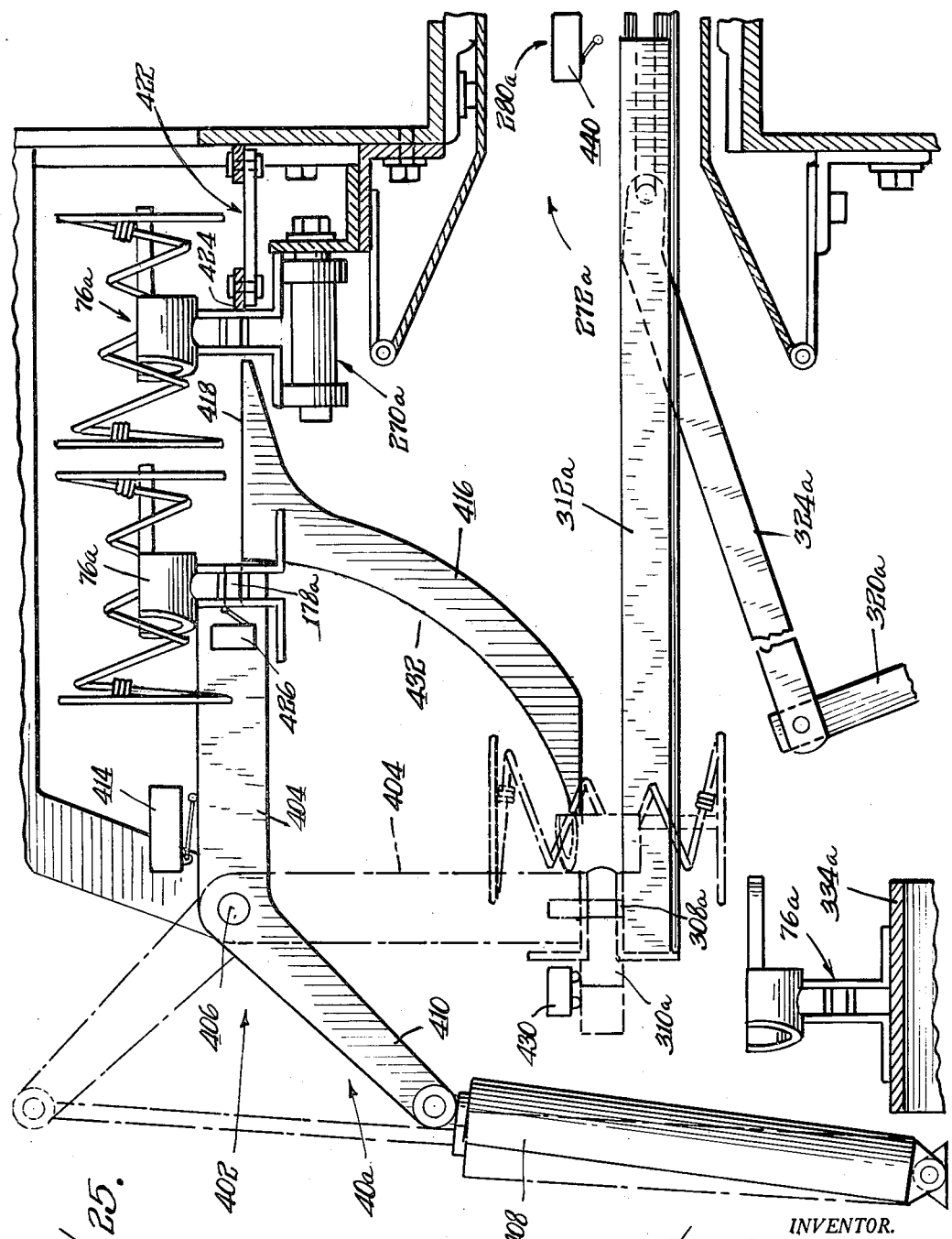

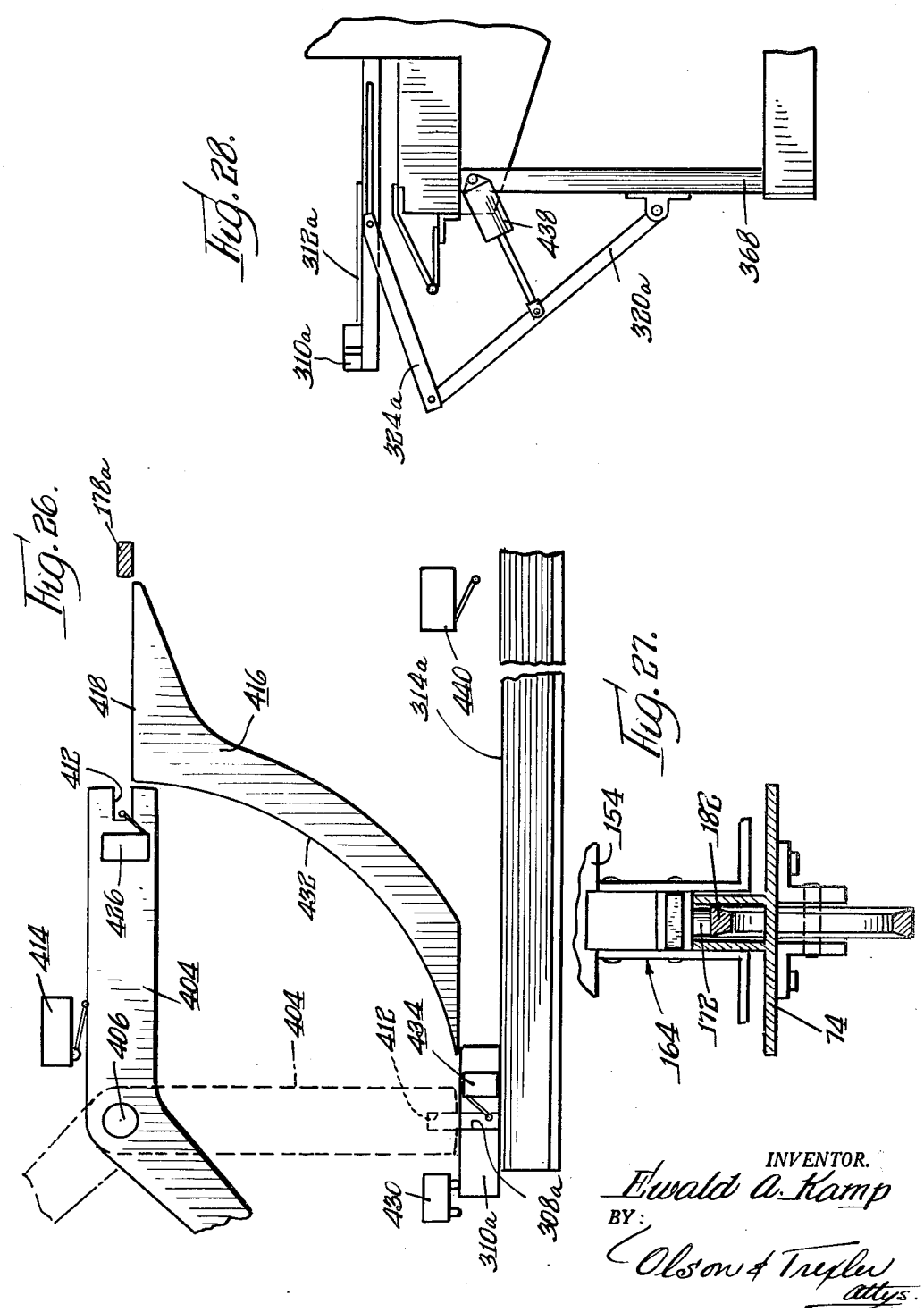

United States Patent Office 3,205,915
Patented Sept. 14, 1965

3,205,915
APPARATUS FOR PRODUCING SPRING CORES
Ewald A. Kamp, Chicago, Ill., assignor, by mesne assignments, to ACD Bedding Corporation, New York, N.Y., a corporation of New York
Filed May 15, 1961, Ser. No. 110,047
17 Claims. (Cl. 140—3)

The present invention relates to the production of inner spring mattress cores.

One object of the invention is to provide new and improved means for producing inner spring mattress cores automatically from wire stock.

Another object of the invention is to substantially eliminate the labor normally required to produce inner spring mattress cores through the use of novel inner spring mattress production apparatus devised by the invention specifically for this purpose.

Another object is to provide an improved inner spring mattress core assembly machine which effects loading of a whole row of springs at once into the machine for assembly.

Another object of the invention is to provide an improved inner spring core assembly machine as recited in the preceding objects in which a single spring loading cycle is carried out quickly and efficiently to deposit a whole row of springs at once into a spring assembling position in the machine.

A further object of the invention is to provide new and improved spring core producing apparatus which obviates the necessity for manual handling of the individual springs from the time the springs are formed from wire stock until the springs are completely assembled into spring cores.

Another object is to provide new and improved apparatus which operates automatically to produce cushioning springs from wire stock and load the springs into racks or temporary holders each of which supports a whole row of springs properly oriented for assembly into an inner spring mattress core.

Another object of the invention is to provide mattress core producing apparatus which will operate automatically to supply to an assembly station of a spring core assembly machine a succession of individual racks each supporting a row of properly oriented springs for movement in unison into the assembly machine.

Another object is to provide new and improved apparatus which automatically produces cushioning springs from wire stock and automatically loads the springs into holders in a manner which provides for and assures proper orientation of the springs with reference to the holders.

Another object is to provide new and improved spring core producing apparatus which operates automatically to produce springs from wire stock and to maintain at a spring assembly station an assured supply of springs assembled in spring loading racks even though the means used to produce springs from wire stock may be temporarily out of service.

Other objects and advantages will become apparent from the following description of the exemplary implementation of the invention illustrated in the drawings, in which:

FIG. 5 is a vertical sectional view taken along the line 5—5 of FIG. 4;

FIG. 6 is a vertical sectional view taken along the line 6—6 of FIG. 4;

FIG. 7 is a vertical sectional view taken along the line 7—7 of FIG. 3;

FIG. 8 is a fragmentary sectional view taken with reference to the line 8—8 of FIG. 7;

FIG. 9 is a vertical sectional view taken along the line 9—9 of FIG. 7;

FIG. 10 is a vertical sectional view taken along the line 10—10 of FIG. 1 and showing rack transfer and storage means;

FIG. 11 is a vertical sectional view taken along the line 11—11 of FIG. 10;

FIG. 12 is a transverse sectional view taken along the line 12—12 of FIG. 10;

FIG. 13 is a sectional view of the rack storage means taken along the line 13—13 of FIG. 12;

FIG. 14 is a vertical sectional view taken along the line 14—14 of FIG. 1, and showing an end view of the spring core assembly unit of the apparatus;

FIG. 15 is a front elevational view of the spring core assembly unit shown in FIG. 14;

FIG. 16 is a vertical sectional view taken along the line 16—16 of FIG. 15;

FIG. 17 is a perspective view taken generally with reference to the line 17—17 of FIG. 16;

FIG. 18 is a fragmentary sectional view taken with reference to the line 18—18 of FIG. 15;

FIG. 19 is a perspective view of the structure illustrated in FIG. 18;

FIG. 20 is a sectional view taken with reference to the line 20—20 of FIG. 19;

FIG. 21 is an exploded perspective view showing rack operating apparatus appearing in FIGS. 17 and 20;

FIG. 22 is a fragmentary sectional view taken with reference to the line 22—22 of FIG. 20 and illustrating loading of a rack into side structure used to move the rack into its spring depositing position with reference to the spring assembly unit;

FIG. 23 is a view similar to FIG. 22 but showing the loading slide structure retracted to release a spring rack upon completion of a spring depositing cycle;

FIG. 24 is a fragmentary plan view taken with reference to the line 24—24 of FIG. 16 and illustrating the incorporation of structure into the apparatus which makes loading of the springs into the spring core assembly unit fully automatic;

FIG. 25 is a vertical sectional view taken with reference to the line 25—25 of FIG. 24 and illustrating further modifications of the structure to effect fully automatic loading of springs into a spring assembly station within the assembly unit;

FIG. 26 is a simplified view of automatic spring rack transfer apparatus illustrated in FIG. 25;

FIG. 27 is a transverse sectional view of a rack support track taken with reference to the line 27—27 of FIG. 1; and FIG. 28 is a simplified end view of the assembly machine unit generally similar to the lower left portion of FIG. 14 but showing power means for the spring depositing structure.

Figure 1:
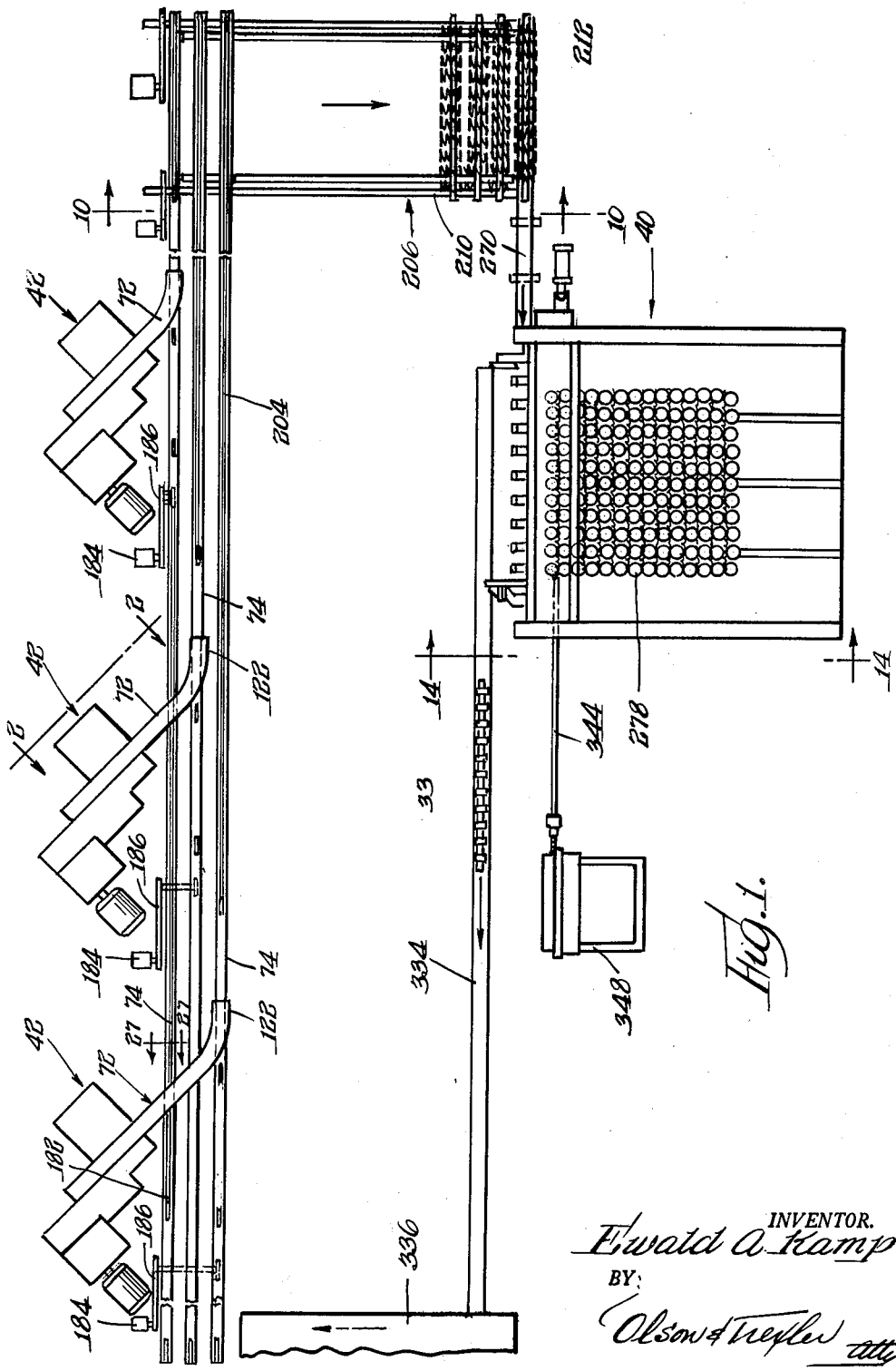
FIGURE 1 is a plan view of spring core producing apparatus constructed in accordance with the invention.

Referring to the drawings in greater detail, the apparatus provided by the invention for forming inner spring mattress cores automatically or substantially automatically from wire stock is illustrated in plan view in FIG. 1.

The inner spring mattress cores are assembled in an assembly machine unit 40 which assembles coiled cushion springs formed from wire stock by a battery of three coiling and knotting machine units 42. Three spring coiling and knotting machine units 42 are used in the present instance in order to provide an assured supply of cushioning springs adequate for matching the spring assembly capacity of the machine unit 40 as it is supplied with springs in accordance with the invention.

Figure 2:
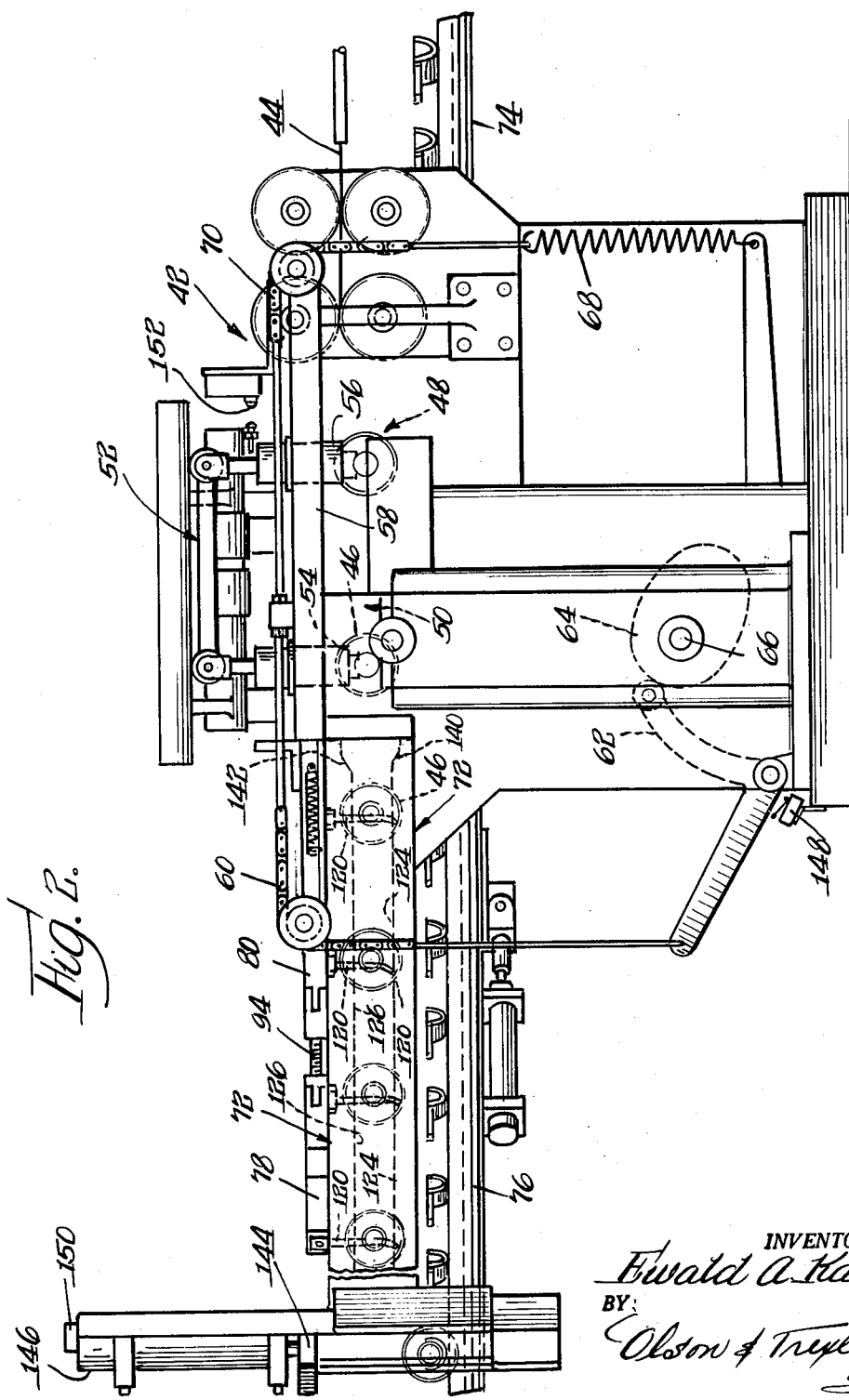
FIG. 2 is a fragmentary vertical view of a spring core producing unit of the apparatus as viewed from line 2—2 of FIG. 1.
Figure 3:
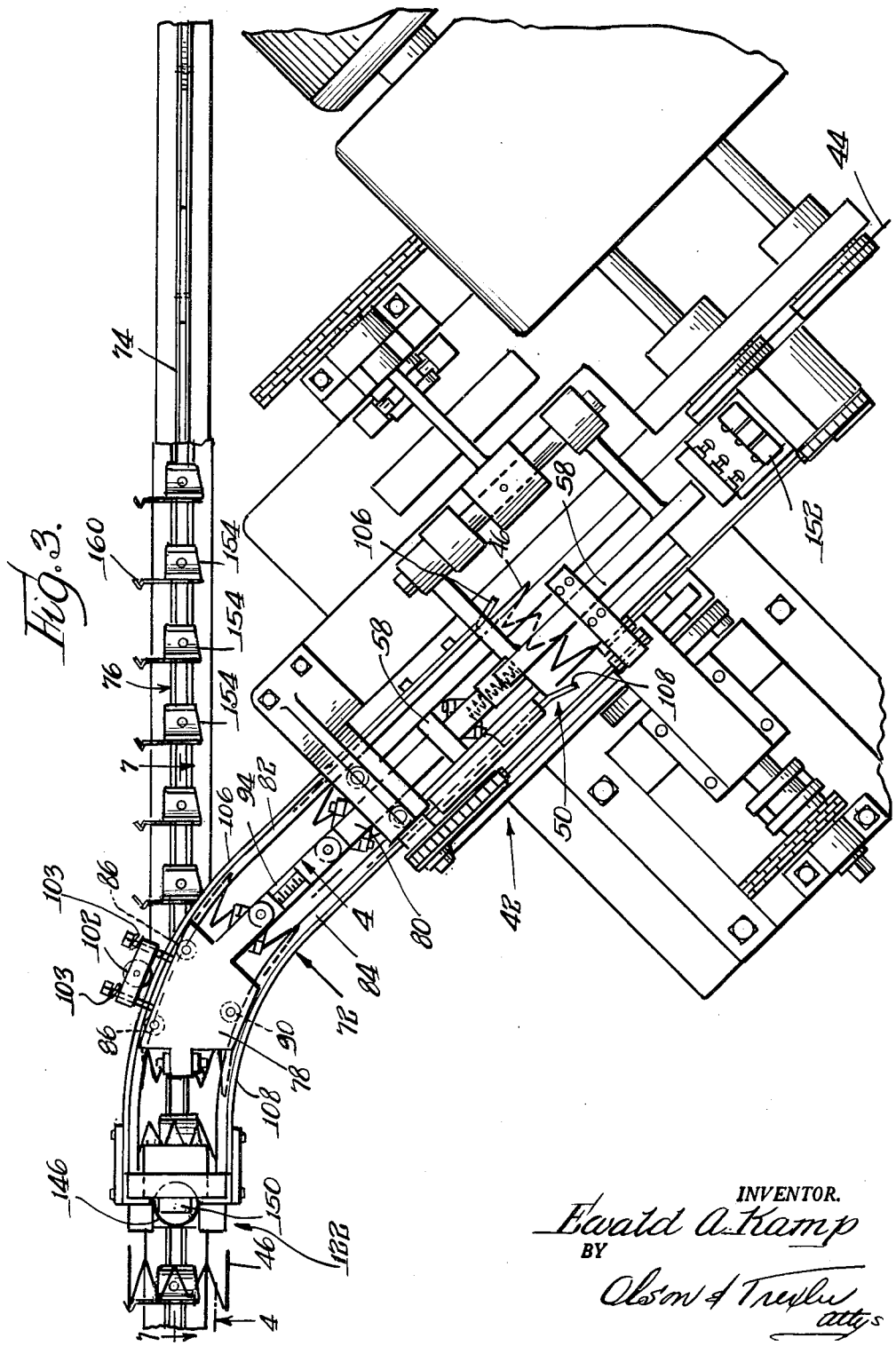
FIG. 3 is a plan view of the spring producing and rack loading apparatus illustrated in FIG. 2.

A typical spring coiling and knotting unit 42 is illustrated in FIGS. 2 and 3.

Each coiling and knotting machine unit 42 forms wire stock 44 into a succession of double ended spiral springs 46 by means of automatic spring coiling and knotting structure which has been developed prior to the present invention and which, as such, is well known in the art. A spring coiling and knotting machine of this character is disclosed in United States patent application Serial No. 840,462, filed September 16, 1959 by James Piliero, which issued as Patent No. 3,043,347. This spring coiling and knotting machine unit uses many of the components of a conventional spring coiling and knotting machine manufactured by the Frank L. Wells Company, of Kenosha, Wisconsin.

The double ended springs 46 are coiled in a typical machine unit 42 at a spring coiling station located within the machine unit at a position identified in FIG. 2 by the number 48. Successive springs coiled in the station 48 are transferred to a knotting station 50 within the typical unit 42 where opposite ends of each spring are knotted by knotting structure specifically disclosed in the above identified application Serial No. 840,462 (Patent No. 3,043,347).

The springs are transferred from the coiling station 48 to the knotting station 50 by means of a reciprocable carriage 52 which supports two spring holders 54, 56 having a horizontal spacing from each other equal to the spacing between the stations 50, 48. The spring holder 56 serves to transfer springs from the station 48 to the station 50 and the holder 54 serves to transfer knotted springs from the station 50 to an out of the way position remote from the station 50.

The spring transfer means 52, including the holders 54, 56 used to transfer springs from the forming station 48 to the knotting station 50 and from the knotting station to an out of the way position as described has, as such, a generally conventional construction similar to the spring transfer means provided for this purpose in commercial spring coiling and knotting machines supplied by the above mentioned Frank L. Wells Company.

The spring transfer means 52 incorporated into a typical spring coiling and knotting unit 42, as described, is operated in synchronism with the coiling and knotting of springs in the stations 48, 50. The synchronized movements of the transfer means 52 are used as a synchronized power source for actuating means provided by the invention which effects a uniform orientation of the successive springs about the axes of the springs which facilitates loading of whole rows of springs in unison into the assembly machine unit 40, as will be described presently.

Basically, the spring transfer means 52 comprises a reciprocable carriage 58 supported for reciprocation in a horizontal direction and providing support to the previously mentioned spring holders 54, 56. The carriage is moved in a spring advancing direction by a tension chain 60 operated by a cam following lever 62 actuated by a cam 64 on a master cam shaft 66 of the machine unit 42. The carriage 58 is retracted by a spring 68 acting through a tension chain 70.

The completely formed springs are removed from the station 50 and released by the spring holder 54 in one end of a horizontal spring orienting and guide chute 72 projecting from the unit 42 and curving into overlying relation to a coacting spring rack support tract 74, FIGS. 1 to 6. As shown most clearly in FIGS. 1 and 3, a spring rack support track 74 is provided for each of the spring coiling and knotting machine units 42, three tracks for the respective machines being disposed in parallel spaced relation to each other and extending alongside the battery of three spring coiling and knotting machine units.

Each of the tracks 74 supplies a continuous succession of elongated spring support racks 76 to the projecting end of the coacting spring guide and orienting chute 72. The construction and function of the individual spring holding racks 76 will be discussed presently in greater detail.

As operation of each spring coiling and knotting unit 42 continues, the springs 46 are transferred into the inlet end of the coacting guide chute 72, as described, and are intermittently indexed along the guide chute to the projecting end of the guide chute. This is accomplished by an articulated train of spring actuator supports 78, 80 supported on horizontal tracks 82, 84 within the chute 72, FIGS. 4 to 6, and operated in synchronism with the previously described carriage 58 of the spring transfer means 52.

The actuator support 78 is designed to move around a curve in the guide chute 72. It has a trapezoidal form in plan view and is supported by two flanged rollers 86 engaging the track 82. The rollers 86 are journaled on two journal blocks 88 depending from the actuator support 78. A flanged roller 90 journaled on a journal block 92 depending from the other side of the actuator support 78 engages the track 84. An outboard roller 102, FIGS. 3 and 5, supported on the actuator support 78 and biased by springs 103 toward the chute 72 engages the chute to hold the rollers 86 against the track 82 and prevent chattering.

The actuator support 78 is connected through an adjustable link 94 with the actuator support 80, which is coupled with the previously mentioned carriage 58. The actuator support 80 is supported on the tracks or rails 82, 84 by suitable rollers (not shown) similar to the supporting rollers for the actuator support 78. Thus, the actuator supports 78, 80, linked to each other and coupled with the carriage 58, are moved back and forth along the chute 72 as the carriage 58 is reciprocated between its advanced and retracted positions, as described.

The spring guide chute 72 itself is formed of two side panels 106, 108 disposed on edge in horizontally spaced relation to each other, as shown in FIGS. 3 and 5, to accommodate the springs 46 therebetween.

Each spring 46 is moved into the chute 72 in a position between the side plates 106, 108 in which opposite ends of the spring engage the respective chute panels 106, 108 with the axes of the springs located in a horizontal position. The two previously mentioned support rails or tracks 82, 84 are secured to the plates 106, 108 at locations above the positions of the springs within the chute. Two support flanges 110, 112 are secured to the lower marginal edges of the respective chute panels 106, 108 and project radially inward to support the springs 46 for movement through the chute.

Each spring 46 entering the chute 72 is slighty compressed to frictionally engage the chute walls or panels 106, 108. For this purpose, the two side panels 106, 108 are flared outwardly at the inlet end of the chute 72, as shown in FIG. 3, to engage and compress each spring 46 entering the chute.

Figure 4:
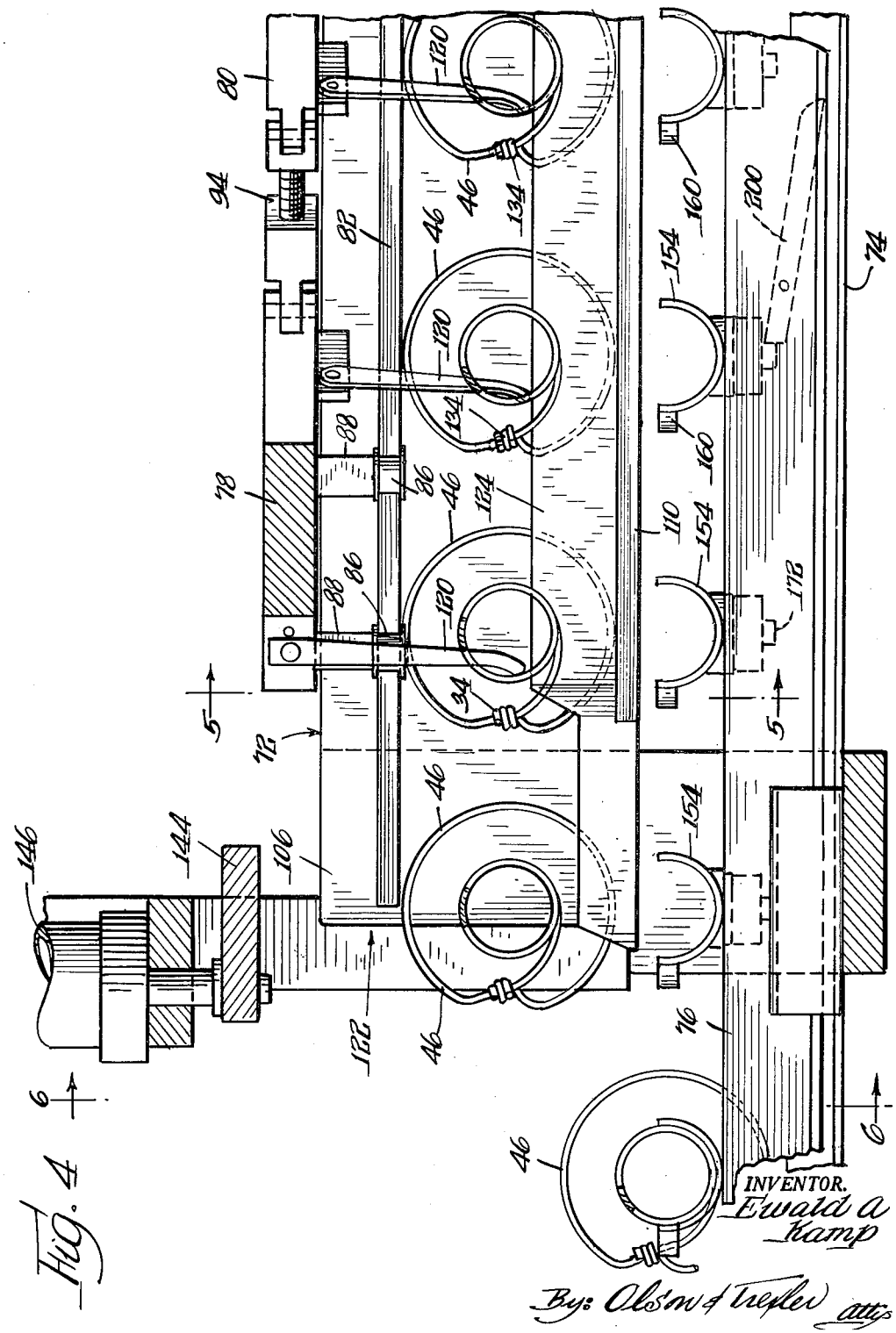
FIG. 4 is a vertical sectional view on an enlarged scale taken along the curved line 4—4 of FIG. 3.

Each of the two actuator supports 78, 80 pivotally supports two pairs of spring advancing fingers 120 which depend into the chute as shown in FIGS. 2, 4 and 5.

Each pair of actuators or fingers 120 is pivotally mounted on its coacting actuator support in a manner such that the fingers are free to pivot in a clockwise direction, with reference to FIG. 4, to allow the fingers to move over springs in the chute upon retraction of the actuators 78, 80 with the carriage 58. However, upon subsequent movement of the supports 78, 80 in the opposite or spring advancing direction, the fingers 120 engage the springs 46 within the chute 72 and are held against counterclockwise movement with reference to FIG. 4 to effect advancement of the springs in the chute. The effect of this intermittent advancement of the springs within the chute is to move a spring 46 into a spring rack loading station 122, FIG. 4, at the outlet end of the chute 72 for each operating cycle of the machine unit 42.

In passing through the chute 72, each spring 46 is oriented rotatably about its own axis to have a predetermined rotary orientation about its axis with respect to a horizontal plane upon reaching the rack loading station 122. The purpose of this is to achieve proper orientation of successive rows of springs subsequently loaded in unison into the assembly machine unit 40.

To effect the desired orientation of the springs, two spring orientation plates 124, 126 are mounted within the chute 76 in spaced relation to the inner faces of the respective chute panels 106, 108 to project toward each other, as shown in FIG. 5. The two orientation plates 124, 126 are designed to coact with each spring 46 at the junctures of the intervening spiral convolutions of the spring with the generally circular convolutions on opposite ends of the spring. The construction of the springs 46, as such, is most clearly illustrated in FIG. 17. As shown in this figure, each spring 46 comprises two generally circular end convolutions 128, 130 joined to opposite ends of a plurality of intervening spiral convolutions 132 the initially free ends of the end convolutions 128, 130 being connected to the spiral convolutions 132 by two knots 134, 136, located in offset positions with respect to the axis of the spring. These general components of a typical spring 46 are identified by the same reference numbers in FIG. 5.

The orientation plate 124 projects upwardly from the spring support flange 110, as shown in FIG. 5, to extend between the adjacent spring end convolution 128 and the adjacent spiral convolution 132 up to the vicinity of the knot 134. Since the knot 134 is located off-center with respect to the axis of the spring, incipient engagement of the knot 134 with the upper edge of the orientation plate 124, as indicated in FIGS. 4 and 5, will serve to limit rotation of the spring in one direction, i.e., the counterclockwise direction with respect to FIG. 4.

The orientation plate 126 projects downwardly from the rail 84 between the adjacent convolution 130 of each spring and the adjacent spiral convolution 132 to the vicinity of the knot 136. The knot 136 coacts with the lower edge of the plate 126 to limit rotation of the spring in the opposite or clockwise direction with respect to FIG. 4.

At the inlet end of the chute 72, the upper edge of the lower orientation plate 124 is turned downwardly, as indicated in dotted lines in FIG. 2, at a position identified by the reference number 140. Similarly, the lower edge of the upper orientation plate 126 is turned upwardly at the inlet end of the chute, as indicated by the number 142 in FIG. 2.

As each spring 46 enters the chute 72, the inlet ends of the orientation plates 124, 126 coact with the spring knots 134, 136 and serve to rotate the springs in one direction or the other as necessary to bring the spring into the desired rotary position with reference to its own axis. The spring is then held in this position against rotation as it passes through the chute by the relationship of the plates 124, 126 with the spring knots 134, 136, as described.

Movement of each spring 46 into the spring rack loading station 122 previously described with reference to FIG. 4 brings the spring into underlying relation to a rack loading head 144 which is reciprocated in timed relation to the machine unit 42 by a pneumatic actuator 146. A timing switch 148 is operated by the actuating lever 62 for the spring transfer carriage 58 and interconnected with an electric control valve 150 for the actuator 146 to cause the actuator 146 to move the head 144 downwardly during the return stroke of the carriage 58 which retracts the actuator supports 78, 80 and fingers 120. A control switch 152 on the machine unit 42 is operated by the carriage 58 as the carriage reaches its retracted position. The switch 152 is connected with the electrical valve 150 for the actuator 146, to retract the spring loading head 144 to its initial raised position as the springs are advanced along the chute 72 by advancement of the carriage 58.

Each downward stroke of the spring loading head 144 moves a spring 46 in the loading station 122 downwardly into an upwardly open semi-cylindrical spring holder 154 on a spring rack 76 supported on the coacting one of the tracks 74 which underlies the station 122. Each spring holder 154 is designed to embrace the medial spiral convolutions 132 of a spring 46 forced down into the holder as shown in FIGS. 7 and 8. Each holder 154 opens upwardly as shown in FIG. 4 and has a radius of curvature in its semi-cylindrical form which is designed to effect a diametrical contraction of the spiral convolutions of a spring pressed downwardly into the holder. The effect of this is to produce a holding action on each spring tending to retain the spring in its holder. The retaining action on each spring due to its tendency to expand within its holder is supplemented by a slight contraction of the upper or inlet side of the holder through which the spring is deposited.

While the frictional engagement of each holder 154 with the spring 46 moved down into the holder by the head 144 serves to retain the spring in its properly oriented position, retention of each spring in the desired position within its holder is further assured by engagement of the spring with a locating hook 160 secured to one side of the coacting holder, as illustrated in FIG. 8, and projecting axially beyond one end of the holder to one side of the holder, as shown. The free end 162 of each spring locating hook 160 is turned radially inward and embraces one end of the spiral convolutions of a coacting spring adjacent the spring knot 134. This engagement of the hook 160 with the spring affords further assurance against either rotary or axial displacement of the spring from the position in which it is moved into the coacting holder by the spring loading head 144.

The spring holders 154 which are loaded with springs in the station 122 are attached to and form component parts of the elongated spring racks 76, previously mentioned. A typical spring rack 76 is illustrated in longitudinal side elevation in FIG. 12, in plan view in FIG. 8 and in transverse sectional view in FIG. 9. Each rack 76, including its spring supports 154, is designated to receive and support at once a linear series of cushioning springs 46 which subsequently form a complete row of springs in the mattress core being produced in the assembly machine unit 40.

Each rack 76 comprises a straight longitudinal support beam 164 formed in this instance by two angle irons 166, 168 secured back to back against supports 170 depending from the individual spring holders 154, as shown in FIGS. 7 and 9. Lugs 172 depend from the underside of the respective spring holder supports 170, as shown in FIG. 7 and serve to coact with indexing structure which intermittently advances the rack through the spring holding station 122, as will presently appear.

Flanges 174, 176 on the lower edges of the angle irons 166, 168 are turned outwardly in opposite directions and serve as a stationary base for supporting the rack on transfer structure to be described. Two lugs 178, 180 are formed on opposite ends of the longitudinal beam 164 of each rack 76 and have a rectangular form as viewed from one end, see FIGS. 12 and 17. The orientation of the lugs 178, 180 is such that the wide dimension of the lugs extends in the horizontal direction when the rack is supported by the flanges, as shown in FIG. 17.

A succession of racks 76 disposed in end-to-end relation to each other is supplied along each of the tracks 74, FIG. 1, to the spring loading station 122 of the respective coiling and knotting machine units 42. Thus, a procession of racks is moved along each track 74 up to the vicinity of the coacting machine unit 42 by means of an endless belt 182 positioned within the track to engage the lugs 172 within each rack beam 164 to frictionally urge the rack along the track toward the coacting spring loading station 122, see FIGS. 1 and 27. Each belt 182 is continuously driven by a coacting motor 184 connected to the belt through a driving transmission 186.

When each rack 76 reaches the vicinity of the coacting spring loading station 122, the rack is intermittently indexed forwardly to bring the successive holders 154 on the rack into alinement with the indexing station. This is effected by the reciprocable action of an elongated indexing bar 188 slidably mounted within the coacting track 74 in the vicinity of the spring loading station 122, as shown in FIGS. 7 and 9. A typical track 74 is formed basically by two parallel side elements 190, 192 spaced from each other as shown in FIG. 9 and providing clearance therebetween for the indexing bar 188, which is supported between the track elements 190, 192 by underlying support members 194, 196, illustrated in FIG. 7.

The track indexing bar 188 is moved back and forth by an air cylinder 198 mounted on the underside of the coacting track and connected to the indexing bar, as shown in FIG. 7. Two gravity biased pawls 200 pivotally supported on the indexing bar 188, as shown in FIG. 7, coact with the depending lugs 172 on the racks to advance the racks in relation to the spring loading station 122 as the bar 188 is advanced longitudinally by the cylinder 198. As the bar 188 is retracted in the opposite direction, the pawls 200 move freely past the rack lugs 172 to leave the overlying rack or racks in their indexed position until the bar 188 is again advanced.

The air cylinder 198 is controlled by an electrical valve 202 which, in turn, is controlled by the previously mentioned switches 148, 152 described in relation to FIG. 2. The air cylinder 198 is timed to advance a new holder 154 into the loading station 122 as the carriage 58 operates to advance a new spring into the loading station. The bar 188 is retracted during the downward stroke of the spring loading head 144 and during the return movement of the carriage 58 to its starting position. The construction of the racks 76 is such that the spacing between the last holder 154 on a rack 76 moving through a loading station 122 and the first holder 154 on the following rack is equal to the spacing between the adjacent holders 154 on each rack.

In this manner the successive racks automatically moved along each track 74 are automatically loaded with properly oriented springs 46 fashioned automatically from wire stock, as described.

The successive racks loaded with springs in the spring loading station 122 are moved along the respective tracks 74 by endless belts 204 mounted within the respective tracks 74 and extending from the loading station 122 to automatic rack storage and supply means 206 arranged to receive racks from each of the tracks 74, as will presently appear. The rack driving belts 204 in the tracks 74 are similar in construction and operation to the previously described endless belts 182 which move the racks into the spring loading station 122.

As shown in FIGS. 10 to 13, the automatic rack storage and supply means 206 comprises a frame 208 positioned at the discharge ends of the tracks 74 and supporting two laterally spaced belt supports 210, 212 in positions which underlie continuations of the tracks 74 and which extend transversely to one side of the continuations of the tracks 74 in an upwardly inclined direction as illustrated in FIGS. 1, 10 and 12. Two endless belts 214 are trained around pulleys 216 on opposite sides of the frame 208 to form respectively two upper belt runs 218 which are supported by the respective belt supports 210, 212 and extend longitudinally along the full length of the belt supports. Both belts 214 are driven continuously by a power drive 219 connected in driving relation to coacting ones of the pulleys 216, as illustrated in FIG. 10.

Racks 76 loaded with springs and discharged from the outlet ends of the respective tracks 74 move onto three parallel rack supports 222 fixed to a swingable frame 224, FIGS. 10 and 11, pivotally mounted on the frame 208 by a pivot 226 which provides for swinging movement of the frame 224 between a normal horizontal position, illustrated in FIG. 10, and a lower position which will be described. The mounting frame 224 for the rack supports 222 is moved between its normal horizontal position illustrated in FIG. 10 and a lower position in which the frame 224 is swung downwardly from the position shown, by a fluid actuating cylinder 228 connected with the frame through a plunger 230.

The disposition of the rack supports 222 on the frame 224 is such that when the frame is in its normal horizontal position the rack supports 222 are alined with the outlet ends of the respective tracks 74, as stated. Hence, loaded racks 76 move longitudinally off the tracks 74 onto the supports 222 where they are stopped by an abutment 232 on the belt support 212, see FIG. 11.

Opposite ends of each rack 76 supported on one of the supports 222 overlie the upper runs 218 of the respective belts 214. Periodically, the actuator 228 is operated to swing the frame 224 downwardly. This allows opposite ends of the racks 76 previously supported by the supports 222 to rest on the belt runs 218. Suitable sensing switches 234 mounted on the rack supports 222 as shown in FIG. 11 are interconnected with an electrical control valve 236 for the actuator 228 to effect downward movement of the frame 224 when the supports 222 are loaded with springs. When one or more of the spring forming and knotting machine units 42 are out of service, the control switches 234 on the corresponding rack supports 222 can be cut out to effect automatic operation of the actuator 228, upon movement of racks onto the supports 222 corresponding to the machine units 42 in service.

The racks 76 lowered onto the belt runs 218 by downward movement of the frame 224, as described, are supported and moved transversely by the belt runs along the supports 210, 212 which extend laterally away from the rack supports 222.

The belt runs 218 carry the racks 76 up the inclined supports 210, 212 until the uppermost rack engages a retractable stop 240 projecting upwardly into the path of the racks to stop the uppermost rack when it approaches the upper ends of the belt runs 218. This stop 240, shown in FIG. 13, is controlled by a solenoid 242 operated in timed relation to the actuator 228 to effect upward movement of the stop 240 into rack stopping position when the frame 224 is lowered to place additional racks on the belt runs 218. After the uppermost rack 76 is stopped by the abutment 240, the succeeding racks continue to move upwardly until stopped by mutual engagement of the springs carried by the successive racks. Movement of the belts 214 continues with the belt runs 218 sliding under the racks which are halted in the manner described.

The belt supports 210, 212 and the upper belt runs 218 are made sufficiently extensive to accommodate a relatively large number of racks 76 disposed side by side along the belt runs between the abutment 240 and the movable rack supports 222. The length of this structure can be extended to provide accommodation for any desired number of racks 76 which, as will presently appear, are held in reserve in overlying relation to the belt runs 218 to supply the assembly machine unit 40.

After the racks 76 deposited by the supports 222 on the belt runs 218 have been carried out of alinement with the supports 222, the supports 222 are moved back to their normal positions by the actuator 228.

After being moved transversely away from the supports 222 by the belt runs 218, the racks 76 are temporarily lifted clear of the belt runs 218 by two parallel rack storage supports 250 located generally between the belt supports 210, 212 in parallel spaced relation to each other, as illustrated in FIGS. 12 and 13. The two rack storage supports 250 extend from the vicinity of the movable rack supports 222 to the upper ends of the belt runs 218.

Movement of the rack storage supports 250 between an elevated rack support level, illustrated in FIGS. 10 and 12, and a lower position places the racks on the belt runs 218 and is controlled by a fluid actuating cylinder 252, FIGS. 10 and 13, operating through linkage means 254 to actuate rack and pinion elevating means 256 for the supports 250.

Normally, a plurality of racks 76 are stored on the rack storage supports 250 which support the racks clear of the belt runs 218.

As racks are needed to supply springs to the core assembly unit 40, the rack storage supports 250 are periodically lowered to rest the racks on the moving belt runs 218. At this time, the abutment 240, FIG. 13, is retracted to allow the uppermost rack on the belt runs 218 to be moved off the belt runs 218 onto a rack transfer track 258 supported in transverse adjacent relation to the upper end of the belt runs 218, as illustrated in FIGS. 10 and 13.

Movement of a rack 76 onto the transfer track 258 operates a sensing switch 260, FIG. 13, which is interconnected with an electrical control valve 262 for the actuator 252, to effect immediate upward movement of the rack storage supports 250 to lift the succeeding racks clear of the belt runs. If desired, the switch 260 can be interconnected with the solenoid 242 to move the abutment 240 into rack blocking position as soon as one rack has moved onto the transfer track 258.

The transfer track 258 is supported on a four bar linkage 264 which is operated by a fluid actuator 266 to elevate the transfer track 258 to a desired level as soon as a rack has been loaded onto the track 258. Coordination of the actuator 266 with loading a rack onto the track 258 can be effected by connecting the rack sensing switch 260 to control an electrical control valve 268, FIG. 13, for the actuator 266.

To review the operation of the automatic rack storage and rack supply means 206, the pivoted frame 224 is normally supported in a horizontal position to locate the rack supports 222 in alinement with the tracks 74 and the rack storage supports 250 are normally supported in elevated positions to support a supply of racks clear of the belt runs 218. From time to time the rack storage supports 250 are temporarily lowered to cause movement of a rack by the belt runs 218 onto the transfer track 258, whereupon the storage supports 250 are again elevated to support the remaining racks. This action is coordinated with the operation of the core assembly machine unit 40, as will presently appear, to supply successive racks as needed by the machine unit 40.

From time to time as the rack supports 222 are loaded with racks from the tracks 74, both the rack storage supports 250 and the rack supports 222 are lowered with the abutment 240 disposed in its rack blocking position. This lowers the racks onto the belt runs 218 which carries all of the racks into juxtaposed parallel positions overlying the supports 250 which are then elevated to support the racks above the belt runs 218, as described.

The vertically movable transfer track section 258, previously described in relation to FIGS. 10 and 13, has sufficient length to support a single rack 76. Upon loading of a single rack 76 onto the track section 258, the track section 258 is moved by the actuator 260 into alinement with a stationary rack transfer track 270, FIGS. 1, and 15 to 17, which extends from the track section 258 into overlying alinement with a spring receiving throat 272 of the spring core assembly machine unit 40.

As shown in FIGS. 15 to 17, the rack transfer track 270 extending into alinement with the throat 272 is formed by a series of anti-friction rollers 274 designed to support the base flanges 174, 176 on the successive racks 76. Provision is made for moving the successive racks longitudinally along the track 270 into alinement with the throat 272. This may be accomplished by inclining the track 270 downwardly or by providing suitable actuating means for moving the successive racks 76 longitudinally along the track.

The successive racks 76 which move longitudinally along the track 270 are stopped in longitudinal alinement with the throat 272 by engagement of each successive rack with suitable abutment means 276, FIG. 15, which stops longitudinal movement of the racks.

It will be noted, with reference to FIGS. 14 to 17, that the spring receiving throat 272 opens outwardly in a forward direction. The width of the throat 272 as viewed from its inlet, FIG. 15, corresponds to the width of the innerspring mattress core 278, FIG. 1, which is assembled in the machine unit 40. Put another way, the width of the throat 272 is at least equal to the length of each successive row of springs 46 which is assembled into a mattress core unit 278.

The spring receiving throat 272 extends to a spring assembly station 280, FIG. 16, within the machine unit 40 where successive rows of springs are assembled together, as will presently appear. The springs are moved into the assembly station 280 to be positioned generally on end within the assembly station. This orientation of the springs 46 within the assembly station 280 positions a portion of one end convolution 128 on each spring between an upper pair of spring assembly jaws 282 and positions a portion of the other end convolution 130 on the spring between a lower pair of spring assembly jaws 284, FIG. 16. An upper pair of jaws 282 and a lower pair of jaws 284 are provided in the assembly machine unit 40 for each spring in a component row of springs being assembled into a mattress core 278. The operation of the machine unit 40 in assembling together successive rows of springs 46 moved into the assembly station 280 will be described presently in greater detail.

It will be noted, with reference to FIGS. 14 and 16 that the springs 46 carried by each rack 76 moving along the track 270 into alinement with the throat 272 are supported in generally horizontal positions. Moreover, the springs and the racks are located above the level of the throat 272, as shown in FIG. 16.

Provision is made for directing each rack 76 from a position on the track 270 overlying the throat 272 down to a level of alinement with the open side of the throat 272, while at the same time providing for rotation of the racks through an angle of approximately ninety degrees to turn the springs supported by the racks into upright positions for translation into the previously mentioned assembly station 280 where the springs are located in upright positions, as previously described.

As will presently appear, provision is made for effecting a fully automatic movement of the successive racks 76 to deposit successive rows of springs in the assembly station 280. The means for achieving this action automatically is illustrated in figures, including FIGS. 24 and 25, which will be described presently in detail. This automatic action obviates any need for active use of an operator.

However, it is contemplated that some users of this equipment may prefer to station an operator to observe the loading of the springs into the assembly station 280. In order to prevent the attention of such an operator from wandering, it is helpful to provide the operator with simple, light duties which enable the operator to participate in the operation of the apparatus without slowing its action.

The means illustrated in FIGS. 14, 16 and 17 provide for such limited participation of the operator in the action of the machinery.

When a rack 76 moves along the track 270 into longitudinal alinement with the throat 272, the springs supported by the racks are disposed in generally horizontal positions as mentioned and the rectangular lugs 178, 180 on opposite ends of the racks are positioned so that the long dimensions of the lugs are generally horizontal, that is, the lugs, too, are turned on their sides, as evidenced by the lug 180 in FIG. 17. Movement of each rack 76 into longitudinal alinement with the throat 272, as recited, brings the two guide lugs 178, 180 on the rack into alinement with two guide assemblies 290 disposed generally at opposite ends of the throat 272 and being formed generally as mirror images of each other.

As best shown in FIGS. 16 and 17, each guide assembly 290 comprises a stationary vertical plate 292 extending forwardly and downwardly from the rack track 270.

A rack lug guide throat or slot 294 is defined on the face of each plate 292 confronting the spring receiving throat 272 of the machine unit 40. As shown, the rack lug guide throat or slot 294 is defined by two horizontally spaced guides 296, 298 secured to the plate 292, as shown in FIG. 17. The throat 294 thus defined extends downwardly in a somewhat rearwardly inclined direction to the lower edge of the plate 292 where the throat is constricted to have a width only slightly larger than the thickness of a typical rack lug 178, 180. The throat 294 is widened toward its upper end to provide clearance for rotation of a rack guide lug within the throat to facilitate turning of a rack in a manner to be described. The upper end of each throat 294 is located somewhat below the level of the lugs 178, 180 on a rack 76 supported by the adjacent track 270. A rack 76 moved along the track 270 to a longitudinal alinement with the spring loading throat 272, as described, is supported for movement from the track 270 forwardly to cause the rack lugs 178, 180 to enter the throats or slots 294 in the guide assemblies 290.

For this purpose, a lug support member 300 is fixed to each plate 292, as shown in FIGS. 16 and 17, to extend from the throat 294 to a projecting end of the element 300 which cantilevers beyond the plate 292 and stops just short of the path of a rack 76 along the track 270. The cantilevering portion of each support element 300 defines a generally horizontal skid surface 302 located just below the adjacent one of the rack lugs 178, 180.

An operator standing in front of the spring loading throat 272 has merely to grasp the base of a rack 76 supported on the track 270 and pull the rack forwardly whereby the rack lugs 178, 180 slide forwardly along the horizontal skid surfaces 302 on the support elements 300. The skid surfaces 302 on the respective elements 300 merge with upper edge portions 304 of the elements 300 which are inclined downwardly to the upper ends of the lug guide slots 294, as as illustrated in FIGS. 16 and 17. The rack lugs 178, 180 tend to slide down the supporting surfaces 304 to the throat 294.

The position of the operator's hand grasping the flange 174 on the base of the rack 76 is located forwardly of the center of gravity of the rack and springs. Thus, when th rack lugs 178, 180 reach the upper ends of the throats 294 the lugs drop down into the throats 294. The slight stabilizing action of the operator's grip on the forward rack flange 174 causes the rack to tip rearwardly through an approximately ninety degree angle, whereupon the lugs 178, 180 progress downwardly through the throats 294, as illustrated in FIG. 16. Each throat 294 is progressively constricted to assure an on edge orientation of the coacting rack lug as it moves out the bottom of the guide throat. This assures rotation of each rack 76 through a ninety degree angle from the time it leaves the track 270 until the time the rack lugs are discharged from the guide throats 294.

The two rack lug guide throats 294 direct the rack lugs 178, 180 into rack support and transfer means which effects a lateral translation of the rack through the spring receiving throat 272 to carry a whole row of springs in unison through the throat 272 into the spring assembly station 280.

The structure which effects translation of each rack through the spring receiving throat 272 provides for movement of opposite ends of the rack in unison and comprises coordinated structure coacting with the respective ends of each rack and being formed substantially as mirror images of each other. The structure which coacts with each end of a rack for this purpose is identified generally in FIGS. 14 to 17 by the reference number 306.

As illustrated in FIGS. 16 and 17, the rack lug guide throat 294 directs a rack lug 278 into a vertical slot 308 in a guide block 310 which is supported on a slide 312 for translation along a support rail 314, FIGS. 16, 17 and 21. It will be borne in mind here that the rack support structures 306 are duplicated as mirror images of each other for supporting the respective ends of a rack and are located in alinement with opposite ends of the spring receiving throat 272. Thus, two support rails 314 are provided and extend in parallel relation to each other rearwardly past opposite ends of the spring receiving throat 272.

The construction of each rack support and actuating assembly 306 is further illustrated in greater detail in FIGS. 18 to 20. As shown, each support rail 314 is formed by an angle iron identified by the reference numeral 314. The slide 312 is also formed by an angle iron which rests upon a generally vertical flange or leg of the angle iron 314 which serves as a support rail.

It is particularly noteworthy that the previously mentioned rack lug receiving slot 308 in the block 310 opens downwardly through a corresponding slot 316 in the slide 312 which opposes the adjacent upper edge of the support rail 314.

In order to receive a rack 76, the slides 312 of the assemblies 306 are actuated, as will presently appear, to bring the slots 308 and 316 in the block 310 and carriage 312, respectively, into alinement with the lower ends of the lug guide slots 294, as illustrated in FIGS. 16, 17, 19, 20 and 22. Hence, rack guide lugs 178, 180 discharged into the block and slide slots 308, 316 rest upon the upper edges of the support rails 314 for movement inwardly along the rails.

Coordinated movement of the slides 312 in synchronism with each other is provided for by a common linkage interconnecting the slides 312 of the two assemblies 306. For this purpose, two motion coordinating arms 320 nonrotatably mounted on a common rocker shaft 322, FIG. 15, are connected through two links 324, FIGS. 14, 16, 18 and 19, with the respective slides 312. As shown in FIGS. 18 and 19, each link 324 is pivotally interconnected with its coacting slide 312 through a pivot block 326 fixed to the slide rearwardly of the block 310.

After each spring holding rack 76 has been moved forwardly and downwardly, as described, to locate the rack lugs 178, 180 in the block slots 308, the rack is moved rearwardly by a simple linear force applied to the rack in a horizontal direction. In this instance, the rack is moved rearwardly by manual force, the rack being supported by the rails 314 and being confined to move with a translatory motion by the previously described structure which causes the guide blocks 310 to move in synchronism with each other, though the operating force may be asymmetrically applied to the rack.

The simple linear movement of a rack thus provided causes the springs supported by the rack to enter the throat 272 which is equipped, as shown in FIGS. 16 and 17, with two spring compressing plates 328, 330 which diverge outwardly, as shown. The upper and lower ends of the springs 46 carried by a rearwardly moving rack engage the plates 328, 330 to effect a slight compression of the springs as they move into the assembly station 280.

During the phase of a normal spring loading operation in which the springs are moved rearwardly into the spring loading station 280 the upper and lower pairs of assembly jaws 282, 284 are mutually separated, as shown in FIG. 16. The rearward movement of a spring holding rack 76 moves the springs into positions in which the rear portions of the upper and lower convolutions of the springs snap into positions between the open assembly jaws 282, 284.

The spring rack 76 is immediately retracted in a forward direction. The springs deposited in the loading station 280 are held in the assembly station by the engagement of the springs with the assembly jaws 282, 284, whereby the springs are extracted from the spring holders 154 of the rack as it moves forwardly.

In this manner, a whole row of springs is deposited in unison in the spring assembly station 280.

The empty rack 76 is moved forwardly beyond the rack loading station, illustrated in FIGS. 16 and 22, in which the rack was positioned in the blocks 310. Thus, the rack is moved forwardly beyond the loading station to an unloading station, illustrated in FIG. 23, in which the slots 308 and 316 in the blocks 310 and slides 312 are carried beyond the ends 332 of the vertical flanges of the support rails 314 which provide support to the rack lugs 178, 180. This allows the rack lugs 178, 180 to drop down past the rack supporting ends of the rails 314 to unload the rack from the rack moving assemblies 306.

As shown in FIG. 1, a conveyor 334 is provided to carry away the empty racks released in the manner described from the rack actuating assemblies 306. The conveyor 334 carries the racks to a storage area 336, FIG. 1, from which the empty racks are placed on the previously mentioned tracks 74 to be moved past the spring loading station 222 for automatic reloading with springs in the manner described.

The structual components of the spring core assembly machine unit 40 which operates to assemble together successive rows of springs deposited in the assembly station 280 are generally conventional in character and need not be described in detail here, since this structure can be readily provided by those skilled in the art.

It is sufficient to note that after a row of springs has been deposited in the assembly station 280, as described, the upper and lower pairs of jaws 282, 284 are moved together to bring the upper and lower convolutions of the newly deposited springs into adjacent relation to corresponding convolutions of a preceding row of springs previously deposited in the assembly machine and retracted to a position just rearwardly of the newly deposited springs.

After the jaws 282, 284 have moved together, the newly deposited row of springs is bound to the preceding row of springs by two helical binding elements 340, 342, FIG. 15, which are supplied to the assembly machine unit 40 through tubes 344, 346 from a helical binding element forming machine unit 348 positioned alongside the assembly machine unit 40, as shown in FIG. 1. The helical binding elements 340, 342 are driven through helical paths of the respective binding elements into spring binding positions between the opposed upper assembly jaws 282 and the lower assembly jaws 284, respectively. The structure which cycles to move the helical binding elements 340, 342 across the spring assembly station or zone 280 to bind the adjacent springs together is generally conventional in design and can be readily provided by those skilled in the art. Hence, it need not be described in detail here.

Cycling of the assembly machine unit 40 to move the opposed assembly jaws 282 and 284 together and to thread the binding elements 340, 342 into assembled positions in relation to the springs is controlled by a cycling switch 350, FIGS. 18 and 19, which is operated as an incident to retraction of an empty spring rack 76 from the spring receiving throat 272 to the rack releasing position illustrated in FIG. 23. It will be recalled that this action moves the slides 312 outwardly beyond the positions of the slides in which loaded racks are loaded into the block slots 308. Movement of the slides 312 to the rack discharging positions described causes a block 352 supported on one of the slides 312, as illustrated in FIGS. 18 and 19, to operate through a spring biased plunger 354 to trip the switch 350 which is connected to initiate a spring assembly cycle of the assembly unit 40, as described.

The operating cycle of the assembly machine unit 40 continues, after the helical elements 340, 342 have been moved into their assembled positions, to open the jaws 282, 284 and effect retraction of the spring core 278 being assembled through a distance equal to the diameter of one spring. This brings the last assembled row of springs into a position in relation to the jaws 282, 284 to be bound to the next row of springs loaded into the assembly zone 280, as described. In this connection, it may be noted, with reference to FIG. 16, that plunger elements 360, 362 disposed in alinement with the jaws 282, 284 are operated in timed relation to opening of the assembly jaws to force spring convolutions from between the jaws in order to allow retraction of the spring core by core retracting elements 364, FIG. 16. After the spring core is retracted, the plungers 360, 362 are immediately retracted to allow entry of end convolutions of springs between the jaws, as described. This cyclic action is repeated for the assembly of each successive row of springs. It is modified, however, to provide for depositing of the first row of springs for each spring core in a position just rearward of the position in which springs are normally deposited in the assembly zone 280. An automatic cycle counter 366 is supported on the frame 368 of the assembly machine unit 40 to coact with a lever 370, which moves once for each assembly cycle, to automatically count the rows of springs assembled by the unit 40.

By counting the rows of springs assemled, the counter 366 senses the completion of assembly of each spring core and is connected to conventional control structure within the machine unit 40 to effect closing of the jaws 282, 284 before the next rack bearing the first row of springs for the next spring core reaches the assembly zone 280. Since the jaws 282, 284 are closed, there is no space between the jaws for the end convolutions of the springs to drop into. Hence, the rearmost portion of the end convolutions of the incoming springs can be moved over the closed jaws 282, 284 past the positions in which the springs are normally deposited in the zone 280 to what would normally be the second station of the incoming springs.

For this reason, the rack 76 carrying the first row of springs for a spring core is moved through the throat 272 to a position rearwardly of the normal spring depositing position of racks within the throat 272. Ths causes the rear portions of end convolutions of the new row of springs to fit behind the core retracting element 364, FIG. 16, to retain the springs upon subsequent withdrawal of the rack 76. The jaws 282, 284 then open to allow the forward portions of the end convolutions of the springs to drop between the jaws in preparation for assembly with the next row of springs which is deposited in the zone 280 in the normal manner.

Fully automatic loading of springs into the spring assembly unit 40 is accomplished by power operated spring loading structure, illustrated in FIGS. 24, 25, 26 and 28. Structural components of the apparatus illustrated in FIGS. 24, 25, 26 and 28 which are similar to components of the apparatus just described are identified with the same reference numbers with the addition of the suffix "a."

Having reference to FIG. 24, movement of a spring rack 76a along the track 270a into a position of longitudinal alinement with the spring receiving throat 272a is sensed by a switch 400. Two power operated rack rotating and depositing assemblies 402 are mounted on the assembly machine 40a in general alinement with opposite ends of the throat 272a. Each assembly 402 comprises a rack swinging arm 404 non-rotatably connected to an actuating shaft 406 for swinging movement between a generally horizontal position, shown in solid lines in FIG. 25, and a generally vertical position, illustrated in broken lines in FIG. 25. The shaft 406 extends between the two assemblies 402 and is connected to the arms 404 in both assemblies to cause both of the arms 404 to swing together. The shaft 406 is rotated in opposite directions through angles of approximately ninety degrees, by means of a fluid actuating cylinder 408 connected to an actuating arm 410 for the shaft 406, as shown in FIG. 25.

As most clearly shown in the simplified illustration appearing in FIG. 26, the free end of each arm 404 defines a rectangular slot 412 designed to receive one of the support lugs 178a, 180a of a spring holding rack 76a. Swinging movement of each arm 404 into the rack receiving position illustrated in solid lines in FIGS. 25 and 26 brings the arm slot 412 up to the level of an adjacent lug 178a or 180a of a rack 76a supported on the track 270a. This position of the arms 404, in which the arms are in readiness to receive the rack lugs is sensed by an arm sensing switch 414. A stationary rack lug support element 416 mounted in association with each of the rack handling assemblies 402, as shown in FIGS. 25 and 26, defines a horizontal rack lug support surface 418 which extends from a position of alinement with the lug receiving slot 412 of the adjacent arm 404 (when the arm is in its rack receiving position) to a position immediately adjacent the position of a rack lug on a rack supported by the track 270a.

As previously mentioned, the switch 400, FIG. 24, senses movement of a rack 76a along the track 270a into a longitudinal alinement with the throat 272a. Location of the arms 404 in their rack receiving positions is sensed by the switch 414 as recited. These switches are suitably connected to control a power actuating cylinder 420 which operates through a four-bar linkage 422, FIGS. 24, 25, to move a rack 76a forwardly toward the arms 404. It will be noted that the four-bar linkage 422 provided for this purpose includes a link 424 which is engaged with the coacting rack 76a and moved forwardly in a manner which maintains the link 424 and the rack in positions continuously parallel to the initial position of the rack on the track 270a.

As a rack 76a is moved forwardly by the linkage 422, the rack lugs 178a and 180a on opposite ends of the rack slide along the support surfaces 418 and enter the lug receiving slots in the arms 404. Movement of the rack lugs into the arm slots 412 is sensed by a switch 426 mounted on one of the arms 404, as shown in FIGS. 25 and 26.

Swinging of the arms 404 from the generally horizontal positions illustrated in solid lines in FIGS. 25 and 26 to the vertical positions illustrated in broken lines in the same figures carries the lug slots 412 in the arms into a position of adjacent alinement with the slots 308a in the blocks 310a when the blocks are in their rack loading positions. Location of the guide blocks 310a in their rack loading positions is sensed by suitable switch means 430.

The sensing switches 426 and 430 are connected in controlling relation to the actuating cylinder 408 for the arms 404 to effect downward swinging movement of the arms when a spring rack has been moved into an assembled relation to the arms, as described, and when the rack receiving blocks 310a have been located in their rack loading stations. As the arms 404 swing downwardly, the rack lugs are retained in the slots 412 in the respective arms 404 by means of arcuate support surfaces 432 formed on the respective support elements 416 to extend downwardly from the lug support surfaces 418 to the upper surfaces of the translatable blocks 310a, as shown. The center of curvature of the arcuate surfaces 432 on the respective support elements 416 coincides with the pivotal axes of the adjacent arms 404 so that the surfaces 432 serve to retain the rack lugs in the arm slots 412 until the slots 412 move into close proximity to the underlying blocks 310a.

As the arm slots 412 are swung into overlying alinement with the block slots 308a the rack lugs drop down into the block slots 308a. Depositing of the rack lugs in the translatable block slots 308a is sensed by lug sensing switches 434 mounted on the respective blocks 310a, as illustrated in FIG. 26.

The sensing switches 434 are connected to effect power movement of the blocks 310a to carry the deposited racks inwardly into spring depositing relation to the spring assembly station or zone 260a within the machine unit 40a. As shown in FIG. 28, a power actuating cylinder 438 is connected to one of the arms 320a to effect power swinging movement of both arms 320a which are connected together for operation in unison. The sensing switches 434 are connected in controlling relation to the actuator 438 to translate the blocks 310a inwardly to a spring depositing position which is sensed by a sensing switch 440, FIGS. 25, 26. The sensing switch 440 operates to reverse the actuator 438 to effect retraction of the blocks 310a to withdraw the unloaded actuator rack.

The actuator 438 moves the blocks 310a out to the rack unloading positions which cause the emptied rack to drop down onto the conveyor 334a which carries the emptied rack away. Release of the rack from the blocks 310a is sensed by the switches 434 which are interconnected through suitable control structure with the actuator 438 to return the blocks 310a to their rack receiving positions which are sensed by the previously mentioned switch means 430, which is interconnected through suitable control structure to stop movement of the blocks 310a in their rack receiving positions.

Sensing of return of the blocks 310a to their rack receiving positions by the switch means 430 and sensing of movement of a new rack 76 into longitudinal alinement with the throat by the sensing switch 400 conditions the automatic rack handling apparatus to continue operation through a succeeding cycle automatically.

This automatic cyclic action repeats to effect the automatic production of spring cores from springs which are automatically produced from wire stock and automatically supplied to the spring assembly unit 40, as described.

It will be appreciated that the present invention is not necessarily limited to the particular structure illustrated, but includes the use of variants and alternatives within the spirit and scope of the invention as defined by the claims.

The invention is claimed as follows:

1. In spring core manufacturing apparatus having a spring forming machine unit for forming a succession of cushion springs from wire stock, in a spring assembly unit for connecting a plurality of springs, the combination comprising a plurality of discrete spring holder racks each defining a linear series of spring holders thereon, a first rack support track mountable adjacent said spring forming machine unit, means for directing a succession of said holder racks along said track in end to end relation to each other, cyclic spring transfer means arranged to transfer a succession of individual springs from said spring forming machine unit to a loading station overlying said track, indexing means coacting with each successive rack to intermittently index the latter along said track to bring successive holders on the rack into underlying alinement with said loading station, ram means for moving successive springs downwardly from said loading station into successive spring holders alined with said loading station; control means for operating said indexing means, said spring means, and said ram means in synchronism; a second rack support track mountable adjacent said spring assembly unit, rack accumulator means disposed between said first and second tracks for receiving racks in side-by-side relationship to each other, means for intermittently transferring loaded racks from said first track to said accumulator means, means for transferring loaded racks individually from said accumulator means to said second track for movement therealong in end-to-end relationship with each other to said spring assembly unit, reciprocable rack holders mountable adjacent said second track and said spring assembly unit to translate individual racks laterally from said second track to deposit entire rows of springs in said spring assembly unit and guide means extending from said second track to said rack holders to guide movement of individual racks from said second track into coacting relation to said rack holders.

2. In a spring core assembly apparatus having a spring core assembly machine unit at a spring assembly station, in combination comprising a plurality of discrete spring holding racks each defining guide lugs on opposite ends thereof, each of said racks including a linear series of spring holders for supporting a series of coil springs corresponding to a row of springs in a mattress core to be formed, means for advancing a plurality of said racks in end-to-end relationship along separate paths of travel, means traversing said paths of travel for receiving a plurality of said racks and storing a plurality of said racks in side-by-side relationship, means defining a rack receiving station for receiving a succession of racks loaded with springs, means for successively transferring racks from said storing means to said receiving station, a pair of spaced rack transfer elements alined with said assembly station for movement between advanced and retracted positions in relation to said assembly station and being shaped to receive opposite ends of a spring holding rack, power operated rack transfer means operatively associated with said rack receiving station and said rack transfer elements to move individual racks from said transfer station into engaged relation to both said rack transfer elements when the latter are in retracted positions relative to said assembly station, and actuating means coacting with said rack transfer elements to move the latter toward and away from said assembly station to effect depositing in said assembly station successive rows of springs carried by successive racks.

3. In apparatus for forming inner spring mattress cores from wire stock having a spring coiling and knotting machine unit including means for forming a succession of double ended springs each comprising spiral convolutions extending between two spring end convolutions, the combination comprising a guide chute extending away from a spring forming position in said machine unit, reciprocable spring transfer means for moving springs from said spring forming position into said guide chute, said guide chute including a pair of spring confining guides disposed in opposed spaced relation to each other to frictionally engage springs moved into the chute, two spring orientation guides supported in spaced generally parallel relation to said respective spring confining guides to effect a predetermining orientation of springs within said chute by engagement of the orientation guides with the spiral convolutions of each spring adjacent the respective end convolutions of the spring, spring advancing means connected for actuation by said spring transfer means and coacting with said chute to advance springs therethrough to a loading station, a plurality of discrete racks each defining a linear series of spring holders, means for intermittently advancing successive ones of said racks alongside said loading station to bring successive spring holders of each rack into adjacent alinement with said spring loading station, and spring loading means operable within said loading station to move successive springs into adjacent spring holders.

4. In apparatus for forming inner spring mattress cores from wire stock having a spring coiling and knotting machine unit including means for forming a succession of double ended springs each comprising a plurality of spiral convolutions extending between two generally circular end convolutions of the spring, the combination comprising a guide chute extending away from a spring knotting station in which springs are finished in said machine unit, reciprocable spring transfer means for intermittently moving springs from said knotting station into the adjacent end of said chute, said guide chute including a pair of guide plates disposed in opposed spaced relation to each other to receive therebetween springs formed by said machine unit, two spring orientation plates supported in spaced generally parallel relation to the inner faces of said respective guide plates to provide space between each orientation plate and the adjacent guide plate for receiving a portion of an end convolution of a spring disposed between said guide plates, said orientation plates extending along said guide plates and cantilevering in opposite directions to effect a desired orientation of springs received between said guide plates with end convolutions on opposite ends of each spring extending between said respective orientation plates and the adjacent guide plates, spring advancing means connected for actuation by said transfer means and being supported for movement back and forth along said guide plates, spring engaging fingers pivotally depending from said spring advancing means into the space intervening between said guide plates to effect intermittent lateral movement of springs through the guide chute to a spring loading station, a track underlying said loading station, a plurality of discrete spring racks movable along said track, each of said racks defining a linear series of spring holders, means for indexing said racks along said track to bring successive spring holders of each rack into underlying alinement with said spring loading station, a spring loading ram operable within said loading station to move successive springs downwarly therefrom into underlying spring holders; and means for effecting synchronized operation of said spring transfer means, said indexing means, and said loading ram.

5. In apparatus for forming mattress spring cores having a spring coiling and knotting machine unit for forming cushioning springs from wire stock, means defining a spring loading station, and means for transferring a succession of springs from said coiling and knotting machine unit to said loading station, in combination comprising a plurality of racks each including means for holding a row of springs, means for advancing successive ones of said racks in end-to-end relationship past said loading station, spring loading means operable in said loading station to move successive springs into racks positioned adjacent the loading station, rack storing means for receiving said racks in side-by-side relationship, power operated rack transfer means extending from said spring loading station to said rack storing means to transfer to said storing means racks loaded with springs at said spring loading station, and transfer means extending from said rack storing means to transfer a succession of racks in end-to-end relationship from said storage means to an assembly station.

6. In apparatus for producing spring cores from wire stock having a plurality of spring forming machine units for producing coil springs from wire stock, means defining a plurality of spring loading stations corresponding to said respective spring forming units, and means for transferring springs from said respective spring forming units to corresponding ones of said spring loading stations, the combination comprising a plurality of spring racks each including means for holding a row of springs, means for moving said racks in end-to-end relationship along a plurality of side-by-side paths of travel past each of said spring loading stations, means for loading springs into racks in each of said loading stations, endless rack transfer means for receiving said racks in side-by-side relationship, means for moving racks loaded in said loading stations into overlying relations to said endless transfer means, means for lowering onto said endless transfer means racks previously moved into overlying relation to said endless transfer means, rack storage means supported between the extreme ends of said endless transfer means for movement between a raised position in which the storage means lifts racks from said transfer means for storage in side-by-side relationship and a lowered position in which said rack storage means lowers racks onto said transfer means for movement thereby, means for directing sucessive racks from said endless transfer means to a rack receiving station adjacent a spring assembly station, power operated translatable rack advancing and retracting means adjacent said assembly station to move individual racks toward and away from said assembly station to deposit successive rows of springs in said assembly station, rotatable rack depositing means, power means coacting with said rack depositing means to rotate the latter between a rack receiving position and a rack depositing position for depositing individual racks in said rack advancing and retracting means, power operated rack displacing means for moving successive racks from said rack receiving station into said rotatable rack depositing means; and means for effecting synchronized operation of said rack displacing means, said rack depositing means, and said rack advancing and retracting means.

7. In apparatus for producing spring cores from wire stock having a plurality of spring forming machine units for forming cushioning springs from wire stock, the combination comprising a plurality of rack transporting tracks corresponding to said respective machine units, a plurality of elongated racks each including means for supporting a row of cushioning springs, means for moving a succession of racks in end-to-end relationship along each of said tracks, spring loading means for loading springs formed by said units into racks moving along the tracks, endless conveyor means, a plurality of track extensions alined with said respective tracks and disposed in overlying relation to one end of said endless conveyor means to receive racks from said respective tracks, operating means coacting with said track extensions to intermittently lower the latter to deposit onto said endless conveyor means racks carried by said track extensions, rack storage means located along an intermediate portion of said endless conveyor mean, means for intermittently moving said rack storage means between an elevated position which lifts racks from said conveyor means and a lowered position which lowers racks onto said conveyor means for movement by the latter, rack transferring track means extending from said endless conveyor mean to a rack receiving station to supply racks to the latter from said endless conveyor means, and rack advancing and retracting means for moving individual racks laterally from said receiving station toward and away from an assembly station to deposit rows of springs in the latter.

8. In apparatus for producing spring cores from wire stock having a plurality of spring forming machine units for forming cushioning springs from wire stock, the combination comprising a plurality of rack transporting tracks corresponding to said respective machine units, a plurality of elongated racks each including means for supporting a row of cushioning springs, means for moving a succession of racks along each of said tracks, spring loading means for loading springs into racks moving along the tracks, endless conveyor means, a plurality of track extensions alined with said respective tracks and disposed in overlying relation to one end of said endless conveyor means to receive racks from said respective tracks, operating means coacting with said track extensions to intermittently lower the latter to deposit onto said endless conveyor means racks carried by said track extensions, rack storage means located along an intermediate portion of said endless conveyor means, means for intermittently moving said rack storage means between an elevated position which lifts racks from said conveyor means and a lowered position which lowers racks onto said conveyor means for movement by the latter, means for directing racks from said endless conveyor means to a rack receiving station, rack guide means extending from said receiving station to an assembly station for guiding movement of individual racks laterally toward and away from said assembly station to deposit rows of springs in the latter, and means for directing movements of racks between said rack receiving station and said rack guide means.

9. In a spring assembly producing machine having spring assembly means and a source of spring supply including spring forming means, the combination comprising a plurality of elongated groups of spring holders respectively for holding separate rows of springs, means for advancing said groups of spring holders in end-to-end relationship along separate paths of travel, means traversing said paths of travel for receiving said groups of spring holders and storing a plurality of said groups of spring holders in side-by-side relationship, and means for successively transferring said groups of spring holders from said storing means.

10. A spring assembly producing machine according to claim 9 which includes power operated spring loading means for loading cushioning springs into said holders.

11. A spring assembly producing machine according to claim 10 which includes means for preorienting individual cushioning springs to have a predetermined orientation before the springs are loaded into the holders.

12. A spring assembly producing machine according to claim 11 which includes spring transfer means operable in synchronism with adjacently disposed spring forming means to automatically transfer springs from said spring forming means into the holders.

13. A spring assembly producing machine according to claim 9, which includes a plurality of racks, each of said groups of spring holders being mounted on one of said racks.

14. A spring assembly producing machine according to claim 13 which includes rack guide means for guiding individual racks from said supply means into spring placing relation to said receiving station.

15. In a spring assembly producing machine having spring assembly means and spring supply means including a spring forming means for forming coil springs having abutment means convolutions thereof, the combination comprising a guide structure for receiving springs from said forming means, means for advancing the springs along said guide structure, said guide structure including an element engageable with said abutment means for orientating the springs in a predetermined manner, a plurality of spring holders, means for advancing said spring holders past said guide structure, means for shifting said spring successively from said guide structure to said spring holder, each of said spring holders including a stop element cooperable with the abutment means on the spring for promoting predetermined orientation of the springs, and each of said spring holders including means for restraining the springs against rotation for maintaining said predetermined orientation.

16. In an apparatus of the type described, a rack for restraining a plurality of coil springs having a plurality of convolutions and knots formed in end convolutions thereof, an elongated body structure, a plurality of gripper means mounted on said body structure for gripping intermediate convolutions of the springs for resisting rotation of the springs, and abutment elements mounted in association with each of said gripper means for engaging knots on said springs for insuring predetermined orientation.

17. In a spring assembly producing machine having a spring assembly means at one location and a source of spring supply including spring forming means at another location, the combintion comprising a plurality of elongated groups of spring holders for respectively holding separate rows of springs, means for advancing said groups of spring holders in end-to-end relationship along separate paths of travel past said source of spring supply for receiving springs therefrom, means traversing said paths of travel for receiving groups of spring holders having springs loaded thereon and storing a plurality of said groups of spring holders with springs thereon in side-by-side relationship, means for successively transferring said groups of spring holders from said storing means to and from said spring assembly means, and additional means for receiving said groups of spring holders from said transferring means and storing a plurality of empty groups of the spring holders in side-by-side relationship, and means for transferring said groups of empty spring holders from said last mentioned storing means to said advancing means.

References Cited by the Examiner

UNITED STATES PATENTS

| | | | |
|---|---|---|---|
| 1,480,797 | 1/24 | Van Orman | 140—1 |
| 1,528,997 | 3/25 | Van Orman | 140—1 |
| 1,682,949 | 9/28 | Ziler | 140—1 |
| 1,779,131 | 10/30 | Holness | 29—173 |
| 1,911,276 | 5/33 | Harley | 29—173 |
| 2,388,106 | 10/45 | Woller | 140—92.8 XR |
| 2,716,308 | 8/55 | Hodges | 140—3 XR |
| 2,718,315 | 9/55 | Nelson et al. | 214—6 |
| 3,012,590 | 12/61 | Hodges et al. | 140—3 |
| 3,056,434 | 10/62 | Miers | 140—2 |

CHARLES W. LANHAM, *Primary Examiner.*

RICHARD A. WAHL, WILLIAM F. PURDY,
*Examiners.*